(12) United States Patent
Kniesel et al.

(10) Patent No.: US 11,492,478 B2
(45) Date of Patent: *Nov. 8, 2022

(54) POLYMER COMPOSITION WITH IMPROVED PAINT ADHESION

(71) Applicant: BOREALIS AG, Vienna (AT)

(72) Inventors: Claudia Kniesel, Linz (DE); Thomas Lummerstorfer, Linz (DE); Anton Sageder, Linz (DE); Michael Otte, Linz (DE); Andreas Jahn, Linz (DE); Angelica Maëlle Delphine Legras, Linz (DE)

(73) Assignee: Borealis AG, Vienna (AT)

( * ) Notice: Subject to any disclaimer, the term of this patent is extended or adjusted under 35 U.S.C. 154(b) by 167 days.

This patent is subject to a terminal disclaimer.

(21) Appl. No.: 16/761,743

(22) PCT Filed: Nov. 6, 2018

(86) PCT No.: PCT/EP2018/080294
§ 371 (c)(1),
(2) Date: May 5, 2020

(87) PCT Pub. No.: WO2019/105689
PCT Pub. Date: Jun. 6, 2019

(65) Prior Publication Data
US 2020/0347216 A1    Nov. 5, 2020

(30) Foreign Application Priority Data

Nov. 28, 2017    (EP) .................... 17204058

(51) Int. Cl.
C08L 23/14        (2006.01)
C08K 3/34         (2006.01)
C08L 23/08        (2006.01)

(52) U.S. Cl.
CPC ............ C08L 23/14 (2013.01); C08K 3/34 (2013.01); C08L 23/0815 (2013.01); C08K 2201/005 (2013.01); C08L 2203/30 (2013.01); C08L 2205/035 (2013.01); C08L 2207/02 (2013.01)

(58) Field of Classification Search
CPC .......... C08L 23/12; C08L 23/06; C08L 23/08; C08L 2207/02; C08K 3/34
See application file for complete search history.

(56) References Cited

U.S. PATENT DOCUMENTS

| | | |
|---|---|---|
| 9,637,602 B2 | 5/2017 | Potter et al. |
| 9,670,293 B2 | 6/2017 | Reznichenko et al. |
| 9,670,347 B2 | 6/2017 | Töltsch et al. |
| 9,701,825 B2 | 7/2017 | Grestenberger et al. |
| 9,708,481 B2 | 7/2017 | Wang et al. |
| 9,745,431 B2 | 8/2017 | Potter et al. |
| 9,751,962 B2 | 9/2017 | Wang et al. |
| 9,777,142 B2 | 10/2017 | Sandholzer et al. |
| 9,802,394 B2 | 10/2017 | Cavacas et al. |
| 9,828,698 B2 | 11/2017 | Wang et al. |
| 9,890,275 B2 | 2/2018 | Sandholzer et al. |
| 9,976,020 B2 | 5/2018 | Nummila-Pakarinen et al. |
| 10,011,708 B2 | 7/2018 | Lampela et al. |
| 10,030,109 B2 | 7/2018 | Boragno et al. |
| 10,040,930 B2 | 8/2018 | Gloger et al. |
| 10,100,185 B2 | 10/2018 | Wang et al. |
| 10,100,186 B2 | 10/2018 | Wang et al. |
| 10,227,427 B2 | 3/2019 | Reichelt et al. |
| 10,450,451 B2 | 10/2019 | Wang et al. |
| 10,519,259 B2 | 12/2019 | Resconi et al. |
| 2012/0108728 A1* | 5/2012 | Tranninger ............. C08L 23/16 524/451 |
| 2013/0203908 A1* | 8/2013 | Kock ...................... C08L 23/06 524/451 |
| 2016/0108219 A1 | 4/2016 | Grestenberger et al. |
| 2016/0185946 A1 | 6/2016 | Sandholzer et al. |
| 2016/0194486 A1 | 7/2016 | Sandholzer et al. |
| 2016/0200838 A1 | 7/2016 | Reznichenko et al. |
| 2016/0208085 A1 | 7/2016 | Gloger et al. |
| 2016/0229158 A1 | 8/2016 | Cavacas et al. |
| 2016/0237270 A1 | 8/2016 | Wang et al. |
| 2016/0244539 A1 | 8/2016 | Resconi et al. |
| 2016/0272740 A1 | 9/2016 | Wang et al. |
| 2016/0280899 A1 | 9/2016 | Tölsch et al. |

(Continued)

FOREIGN PATENT DOCUMENTS

| | | |
|---|---|---|
| CN | 105745270 A | 7/2016 |
| CN | 105793348 A | 7/2016 |

(Continued)

OTHER PUBLICATIONS

Busico et al., "Alk-1-ene Polymerization in the Presence of a Monocyclopentadienyl Zirconium(IV) Acetamidinate Catalyst: Microstructural and Mechanistic Insights$^a$," *Macromol. Rapid Commun.* 28:1128-1134 (2007).

(Continued)

*Primary Examiner* — Mark S Kaucher

(74) *Attorney, Agent, or Firm* — Leydig, Voit & Mayer, Ltd.

(57) ABSTRACT

The invention is directed at a polypropylene composition comprising a heterophasic propylene copolymer, a plastomer and an inorganic filler. Furthermore, the invention directed at an article comprising the polypropylene composition and the use of the polypropylene composition to improve the adhesion performance of an article.

13 Claims, No Drawings

(56) References Cited

U.S. PATENT DOCUMENTS

| | | |
|---|---|---|
| 2016/0304681 A1 | 10/2016 | Potter et al. |
| 2016/0311951 A1 | 10/2016 | Reichelt et al. |
| 2016/0311988 A1 | 10/2016 | Potter et al. |
| 2016/0312018 A1 | 10/2016 | Vestberg et al. |
| 2016/0312019 A1 | 10/2016 | Lampela et al. |
| 2016/0347943 A1 | 12/2016 | Wang et al. |
| 2016/0347944 A1 | 12/2016 | Wang et al. |
| 2017/0009068 A1 | 1/2017 | Kahlen et al. |
| 2017/0029980 A1 | 2/2017 | Wang et al. |
| 2017/0088689 A1 | 3/2017 | Van Mierloo et al. |
| 2017/0137617 A1 | 5/2017 | Wang et al. |
| 2017/0166711 A1 | 6/2017 | Boragno et al. |
| 2017/0218172 A1 | 8/2017 | Wang et al. |
| 2017/0313867 A1 | 11/2017 | Lampela et al. |
| 2017/0321048 A1 | 11/2017 | Nummila-Pakarinen et al. |
| 2018/0079875 A1 | 3/2018 | Braun et al. |
| 2018/0194881 A1 | 7/2018 | Denifl et al. |
| 2020/0263015 A1 | 8/2020 | Kneisel et al. |
| 2021/0238376 A1 | 8/2021 | Kahlen et al. |

FOREIGN PATENT DOCUMENTS

| | | |
|---|---|---|
| EP | 0 491 566 A2 | 6/1992 |
| EP | 0 586 390 B1 | 5/1997 |
| EP | 0 591 224 B1 | 2/1998 |
| EP | 0 887 379 A1 | 12/1998 |
| EP | 2 410 007 A1 | 1/2012 |
| EP | 2 610 270 A1 | 7/2013 |
| EP | 2 610 271 A1 | 7/2013 |
| EP | 2 610 272 A1 | 7/2013 |
| EP | 2 610 273 A1 | 7/2013 |
| EP | 2 947 118 A1 | 11/2015 |
| JP | 2008-274131 A | 11/2008 |
| JP | 2016-539229 A | 12/2016 |
| JP | 2018-526498 A | 9/2018 |
| KR | 1020160010543 A | 1/2016 |
| WO | WO 87/07620 A1 | 12/1987 |
| WO | WO 92/12182 A1 | 7/1992 |
| WO | WO 92/19653 A1 | 11/1992 |
| WO | WO 92/19658 A1 | 11/1992 |
| WO | WO 99/24478 A1 | 5/1999 |
| WO | WO 99/24479 A1 | 5/1999 |
| WO | WO 00/68315 A1 | 11/2000 |
| WO | WO 2004/000899 A1 | 12/2003 |
| WO | WO 2004/111095 A1 | 12/2004 |
| WO | WO 2012/007430 A1 | 1/2012 |
| WO | WO 2012/010482 A1 | 1/2012 |
| WO | WO 2014/023603 A1 | 2/2014 |
| WO | WO 2015/082403 A1 | 6/2015 |
| WO | WO 2017/041296 A1 | 3/2017 |

OTHER PUBLICATIONS

Busico et al., "Full Assignment of the $^{13}$C NMR Spectra of Regioregular Polypropylenes: Methyl and Methylene Region," *Macromolecules* 30:6251-6263 (1997).
Busico et al., "Microstructure of polypropylene," *Prog. Polym. Sci.* 26:443-533 (2001).
Cheng, "$^{13}$C NMR Analysis of Ethylene-Propylene Rubbers," *Macromolecules* 17:1950-1955 (1984).
Plastics Additives Handbook, 5th edition, Hans Zweifel, Editor, Hanser Publishers, Munich, pp. 871-873 (2001).
Plastics Additives Handbook, 5th edition, Hans Zweifel, Editor, Hanser Publishers, Munich, pp. 956-965 (2001).
Plastics Additives Handbook, 6th edition, Hans Zweifel, Editor, Hanser Publishers, Munich, pp. 1141-1190 (2009).
Resconi et al., "Selectivity in Propene Polymerization with Metallocene Catalysts," *Chem. Rev.* 100(4):1253-1345 (2000).
Wang et al., "Structural Analysis of Ethylene/Propylene Copolymers Synthesized with a Constrained Geometry Catalyst," *Macromolecules* 33:1157-1162 (2000).
Zhou et al., "A new decoupling method for accurate quantification of polyethylene copolymer composition and triad sequence distribution with $^{13}$C NMR," *J. Magnet. Reson.* 187:225-233 (2007).
European Patent Office, Partial European Search Report in European Patent Application No. 17204058.6 (dated Mar. 9, 2018).
European Patent Office, Extended European Search Report in European Patent Application No. 17204058.6 (dated May 8, 2018).
European Patent Office, International Search Report in International Application No. PCT/EP2018/080294 (dated Feb. 18, 2019).
European Patent Office, Written Opinion in International Application No. PCT/EP2018/080294 (dated Feb. 18, 2019).
International Bureau of WIPO, International Preliminary Report on Patentability in International Application No. PCT/EP2018/080294 (dated Sep. 24, 2019).
U.S. Appl. No. 14/914,501, filed Feb. 25, 2016.
U.S. Appl. No. 14/911,295, filed Feb. 10, 2016.
U.S. Appl. No. 14/911,300, filed Feb. 10, 2016.
U.S. Appl. No. 14/911,299, filed Feb. 10, 2016.
U.S. Appl. No. 15/022,671, filed Mar. 17, 2016.
U.S. Appl. No. 15/030,556, filed Apr. 19, 2016.
U.S. Appl. No. 15/022,664, filed Mar. 17, 2016.
U.S. Appl. No. 15/029,493, filed Apr. 14, 2016.
U.S. Appl. No. 15/027,129, filed Apr. 4, 2016.
U.S. Appl. No. 15/101,837, filed Jun. 3, 2016.
U.S. Appl. No. 15/106,101, filed Jun. 17, 2016.
U.S. Appl. No. 15/103,783, filed Jun. 10, 2016.
U.S. Appl. No. 15/039,107, filed May 25, 2016.
U.S. Appl. No. 15/103,744, filed Jun. 10, 2016.
U.S. Appl. No. 15/102,628, filed Jun. 8, 2016.
U.S. Appl. No. 15/113,907, filed Jul. 25, 2016.
U.S. Appl. No. 15/113,922, filed Jul. 25, 2016.
U.S. Appl. No. 15/113,517, filed Jul. 22, 2016.
U.S. Appl. No. 15/115,929, filed Aug. 2, 2016.
U.S. Appl. No. 15/310,283, filed Nov. 10, 2016.
U.S. Appl. No. 15/514,641, filed Mar. 27, 2017.
U.S. Appl. No. 15/531,974, filed May 31, 2017.
U.S. Appl. No. 15/526,957, filed May 15, 2017.
U.S. Appl. No. 15/566,588, filed Oct. 13, 2017.
U.S. Appl. No. 15/741,861, filed Jan. 4, 2018.
U.S. Appl. No. 16/633,699, filed Jan. 24, 2020.
U.S. Appl. No. 16/761,757, filed May 5, 2020.
U.S. Appl. No. 16/652,115, filed Mar. 30, 2020.
U.S. Appl. No. 16/763,014, filed May 11, 2020.
U.S. Appl. No. 16/763,001, filed May 11, 2020.
U.S. Appl. No. 16/768,330, filed May 29, 2020.
Korean Intellectual Property Office, Notice of Allowance in Korean Patent Application No. 10-2020-7009349 (dated Oct. 18, 2021).
Japan Patent Office, Notification of Reasons for Rejection in Japanese Patent Application No. 2020-518416 (dated Apr. 6, 2021).
The Patent Office of the People's Republic of China, First Notification of Office Action in Chinese Patent Application No. 201880068351.2 (dated Jul. 22, 2022).

\* cited by examiner

POLYMER COMPOSITION WITH IMPROVED PAINT ADHESION

CROSS-REFERENCE TO RELATED APPLICATIONS

This patent application is the U.S. national phase of International Application No. PCT/EP2018/080294, filed on Nov. 6, 2018, which claims the benefit of European Patent Application No. 17204058.6, filed Nov. 28, 2017, the disclosures of which are incorporated herein by reference in their entireties for all purposes.

The present invention is directed at a polypropylene composition (C), an article comprising the polypropylene composition (C) and the use of the polypropylene composition (C) to enhance paint adhesion of an article.

In the field of automotive applications, polyolefins such as polypropylenes are the material of choice as they can be tailored to specific purposes needed. For instance, heterophasic polypropylenes are widely used in the automobile industry, for instance in bumper applications, as they combine good stiffness with reasonable impact strength. However, the surface of molded articles obtained from heterophasic polypropylene composition is rather smooth having a low polarity resulting in unfavourable prerequisites for interactions with a coating material. Thus, for demanding applications like automotive parts a pre-treatment as well as the application of adhesion promoters (so called primers) is typically required to ensure proper paint adhesion. Due to environmental and economic reasons it is desired to reduce the use of primers to a minimum, preferably to avoid the use of primers entirely.

Thus, the object of the present invention is to provide a material which enables a skilled person to produce molded articles having a good stiffness, good impact balance and high paint adhesion, without the necessity to apply adhesion promoters such as primers.

The finding of the present invention is to provide a polypropylene composition (C) comprising a specific heterophasic propylene copolymer (HECO), a specific plastomer (PL) and a specific inorganic filler (F).

In a first aspect the present application is directed at a polypropylene composition (C) comprising:
(a) 55 to 95 parts per weight of a heterophasic propylene copolymer (HECO);
(b) 1 to 20 parts per weight of a plastomer (PL); and
(c) 4 to 25 parts per weight of an inorganic filler (F);
based on the total parts per weight of compounds (a), (b) and (c);
wherein the heterophasic propylene copolymer (HECO) has am amount of xylene cold soluble (XCS) fraction in the range of 22 to 45 wt.-%, based on the weight of the polypropylene composition (C); and
wherein the inorganic filler (F) has median particle size ($D_{50}$) in the range of 1.5 to 8.0 μm.

The polypropylene composition (C) may have:
(a) a melt flow rate $MFR_2$ (230° C., 2.16 kg) measured according to ISO 1133 of at least 2 g/10 min, like in the range of 2 to 50 g/10 min;
and/or
(b) xylene soluble (XCS) fraction having an intrinsic viscosity (IV) of at least 3.0 dl/g, like in the range of 3.0 to 4.5 dl/g.

The polypropylene composition (C) may have:
(a) a tensile modulus measured according to ISO 527-2 of at least 1000 MPa, like in the range of 1000 to 3500 MPa;
and/or
(b) a tensile strength at yield measured according to ISO 527-2 of at east 5 MPa, like in the range of 5 to 50 MPa;
and/or
(c) a tensile stress at break measured according to ISO 527-2 of at least 5 MPa, like in the range of 5 to 50 MPa;
and/or
(d) a tensile elongation at break measured according to ISO 527-2 of not more than 100%, like in the range of 5 to 100%;
and/or
(e) a Charpy Impact Strength (NIS+23) measured according to ISO 179-1 eA:2000 at +23° C. of at least 20 $kJ/m^2$, like in the range of 20 to 80 $kJ/m^2$;
and/or
(f) a Charpy Impact Strength (NIS-20) measured according to ISO 179-1eA:2000 at −20° C. of at least 2 $kJ/m^2$, like in the range of 2 to 20 $kJ/m^2$.

The heterophasic propylene copolymer (HECO) present in the polypropylene composition (C) may comprise:
(a) 70 to 98 parts per weight of a first heterophasic propylene copolymer (HECO1); and
(b) 2 to 30 parts per weight of a second heterophasic propylene copolymer (HECO2);
wherein the heterophasic propylene copolymer (HECO1) differs from the heterophasic propylene copolymer (HECO2) in the comonomer content of the xylene cold soluble (XCS) fraction and/or in the intrinsic viscosity (IV) of the xylene cold soluble (XCS) fraction.

The heterophasic propylene copolymer (HECO) present in the polypropylene composition (C) may comprise a heterophasic propylene copolymer (HECO1) and a heterophasic propylene copolymer (HECO2), wherein the heterophasic propylene copolymer (HECO1) and the heterophasic propylene copolymer (HECO2) together may fulfil in-equation (I):

$$C_x(XCS)[HECO1]/C_x(XCS)[HECO2] > 1.0 \quad (I)$$

wherein
$C_x$ (XCS) [HECO1] is the comonomer content of the xylene cold soluble (XCS) fraction of the heterophasic propylene copolymer (HECO1);
$C_x$ (XCS) [HECO2] is the comonomer content of the xylene cold soluble (XCS) fraction of the heterophasic propylene copolymer (HECO2).

The heterophasic propylene copolymer (HECO) present in the polypropylene composition (C) may comprise a heterophasic propylene copolymer (HECO1) and a heterophasic propylene copolymer (HECO2), wherein the heterophasic propylene copolymer (HECO1) and the heterophasic propylene copolymer (HECO2) together may fulfil in-equation (II):

$$IV(XCS)[HECO2]/IV(XCS)[HECO1] > 1.0 \quad (II)$$

wherein
IV (XCS) [HECO1] is the intrinsic viscosity (IV) of the xylene cold soluble (XCS) fraction of the heterophasic propylene copolymer (HECO1);
IV (XCS) [HECO2] is the intrinsic viscosity (IV) of the xylene cold soluble (XCS) fraction of the heterophasic propylene copolymer (HECO2).

The heterophasic propylene copolymer (HECO) present in the polypropylene composition (C) may comprise
(a) 5 to 30 parts per weight of a first heterophasic propylene copolymer (HECO1);

(b) 5 to 30 parts per weight of a second heterophasic propylene copolymer (HECO2); and
(c) 40 to 90 parts per weight of a third heterophasic propylene copolymer (HECO3);

wherein the heterophasic propylene copolymer (HECO1) differs from the heterophasic propylene copolymer (HECO2) in the comonomer content of the xylene cold soluble (XCS) fraction and/or the intrinsic viscosity (IV) of the xylene cold soluble (XCS) fraction; and wherein the heterophasic propylene copolymer (HECO3) has a higher melt flow rate $MFR_2$ (230° C., 2.16 kg) measured according to ISO 1133 than the heterophasic propylene copolymer (HECO1) and the heterophasic propylene copolymer (HECO2) respectively.

The heterophasic propylene copolymer (HECO) present in the polypropylene composition (C) may comprise a heterophasic propylene copolymer (HECO1), a heterophasic propylene copolymer (HECO2) and a heterophasic propylene copolymer (HECO3), wherein (a1) the heterophasic propylene copolymer (HECO1) and the heterophasic propylene copolymer (HECO2) together may fulfil in-equation (I):

$$C_x(XCS)[HECO1]/C_x(XCS)[HECO2] > 1.0 \quad (I)$$

wherein
$C_x$ (XCS) [HECO1] is the comonomer content of the xylene cold soluble (XCS) fraction of the heterophasic propylene copolymer (HECO1);
$C_x$ (XCS) [HECO2] is the comonomer content of the xylene cold soluble (XCS) fraction of the heterophasic propylene copolymer (HECO2);

and/or (a2) the heterophasic propylene copolymer (HECO1) and the heterophasic propylene copolymer (HECO2) together may fulfil in-equation (II):

$$IV(XCS)[HECO2]/IV(XCS)[HECO1] > 1.0 \quad (II)$$

wherein
IV (XCS) [HECO1] is the intrinsic viscosity (IV) of the xylene cold soluble (XCS) fraction of the heterophasic propylene copolymer (HECO1);
IV (XCS) [HECO2] is the intrinsic viscosity (IV) of the xylene cold soluble (XCS) fraction of the heterophasic propylene copolymer (HECO2);

and (b) the heterophasic propylene copolymer (HECO1), the heterophasic propylene copolymer (HECO2) and the heterophasic propylene copolymer (HECO3) together may fulfil in-equation (III):

$$2 \times MFR[HECO3]/MFR[HECO1]+[MFR[HECO2] > 1.0 \quad (III)$$

wherein
MFR [HECO1] is the melt flow rate MFR2 (230° C., 2.16 kg) measured according to ISO 1133 of the heterophasic propylene copolymer (HECO1);
MFR [HECO2] is the melt flow rate MFR2 (230° C., 2.16 kg) measured according to ISO 1133 of the heterophasic propylene copolymer (HECO2); and
MFR [HECO3] is the melt flow rate MFR2 (230° C., 2.16 kg) measured according to ISO 1133 of the heterophasic propylene copolymer (HECO3).

The plastomer (PL) comprised in the polypropylene composition (C) may be an elastomeric ethylene copolymer (EC) comprising units derivable from ethylene and at least one $C_4$ to $C_{20}$ α-olefin, preferably an elastomeric ethylene copolymer (EC) consisting of units derivable from ethylene and 1-octene.

The inorganic filler (F) comprised in the polypropylene composition (C) may be a mineral filler, preferably a mineral filler selected from the group consisting of talc, mica and mixtures thereof.

The inorganic filler (F) comprised in the polypropylene composition (C) may have a median particle size ($D_{50}$) of at least 1.5 μm, like in the range of 1.5 to 8.0 μm.

The polypropylene composition (C) may not comprise other polymers besides the heterophasic propylene copolymer (HECO) and and the plastomer (PL) in an amount exceeding 5 wt.-%, preferably in an amount exceeding 2.5 wt.-%, more preferably in an amount exceeding 0.8 wt.-%, based on the weight of the polypropylene composition (C).

The heterophasic propylene copolymer (HECO) and and the plastomer (PL) comprised in the polypropylene composition (C) may be the only polymers present in the the polypropylene composition (C).

In a second aspect the present invention is directed at an article, preferably a molded article like an injection molded article or a compression molded article, comprising the polypropylene composition (C).

In a third aspect the present invention is directed at the use of the polypropylene composition (C) to enhance paint adhesion of a moulded article.

In the following the polypropylene composition (C) and the article comprising the polypropylene composition (C) are described in more detail:

The Polypropylene Composition (C)

The polypropylene composition (C) comprises a heterophasic propylene copolymer (HECO),
a plastomer (PL) and an inorganic filler (F).

It is appreciated that the polypropylene composition (C) comprises the heterophasic propylene copolymer (HECO) in an amount of 55 to 95 parts per weight, preferably in an amount of 60 to 90 parts per weight, more preferably in an amount of 64 to 85 parts per weight, based on the total parts by weight of the heterophasic propylene copolymer (HECO), the plastomer (PL) and the inorganic filler (F).

It is appreciated that the polypropylene composition (C) comprises the plastomer (PL) in an amount of 1 to 20 parts per weight, preferably an amount of 1 to 16 parts per weight, more preferably an amount of 2 to 14 parts per weight, based on the total parts by weight of the heterophasic propylene copolymer (HECO), the plastomer (PL) and the inorganic filler (F).

It is appreciated that the polypropylene composition (C) comprises the inorganic filler (F) in an amount of 4 to 25 parts per weight, preferably in an amount of 9 to 24 parts per weight, more preferably in an amount of 13 to 22 parts per weight, based on the total parts by weight of the heterophasic propylene copolymer (HECO), the plastomer (PL) and the inorganic filler (F).

In an embodiment the polypropylene composition (C) comprises 55 to 95 parts per weight of the heterophasic propylene copolymer (HECO), 1 to 20 parts per weight of the plastomer (PL) and 4 to 25 parts per weight of the inorganic filler (F), based on the total parts by weight of the heterophasic propylene copolymer (HECO), the plastomer (PL) and the inorganic filler (F).

In an embodiment the polypropylene composition (C) comprises 60 to 90 parts per weight of the heterophasic propylene copolymer (HECO), 1 to 16 parts per weight of the plastomer (PL) and 9 to 24 parts per weight of the inorganic filler (F), based on the total parts by weight of the heterophasic propylene copolymer (HECO), the plastomer (PL) and the inorganic filler (F).

In an embodiment the polypropylene composition (C) comprises 64 to 85 parts per weight of the heterophasic propylene copolymer (HECO), 2 to 14 parts per weight of the plastomer (PL) and 13 to 22 parts per weight of the inorganic filler (F), based on the total parts by weight of the heterophasic propylene copolymer (HECO), the plastomer (PL) and the inorganic filler (F).

In an embodiment the polypropylene composition (C) comprises the heterophasic propylene copolymer (HECO) in an amount of 55 to 95 wt.-%, the plastomer (PL) in an amount of 1 to 20 wt.-% and the inorganic filler in an amount of 4 to 25 wt.-%, based on the weight of the polypropylene composition (C).

In an embodiment the polypropylene composition (C) comprises the heterophasic propylene copolymer (HECO) in an amount of 60 to 90 wt.-%, the plastomer (PL) in an amount of 1 to 16 wt.-% and the inorganic filler in an amount of 9 to 24 wt.-%, based on the weight of the polypropylene composition (C).

In an embodiment the polypropylene composition (C) comprises the heterophasic propylene copolymer (HECO) in an amount of 64 to 85 wt.-%, the plastomer (PL) in an amount of 2 to 14 wt.-% and the inorganic filler in an amount of 13 to 22 wt.-%, based on the weight of the polypropylene composition (C).

It is a finding of the present invention that the paint adhesion of a polypropylene composition comprising a heterophasic propylene copolymer, a plastomer and an inorganic filler can be improved when providing an inorganic filler having a specific particle size.

It is appreciated that the inorganic filler (F) has a median particle size ($D_{50}$) of at least 1.5 µm, preferably of at least 2.5 µm, more preferably of at least 3.0 µm; like in the range of 1.5 to 8.0 µm, preferably in the range of 2.0 to 7.0 µm, more preferably in the range of 3.0 to 6.0 µm.

In an embodiment the inorganic filler (F) is talc having a median particle size ($D_{50}$) of at least 1.5 µm, preferably of at least 2.0 µm, more preferably of at least 3.0 µm; like in the range of 1.5 to 6.0 µm, preferably in the range of 2.0 to 5.0 µm, more preferably in the range of 3.0 to 4.5 µm.

In an embodiment the inorganic filler (F) is mica having a median particle size ($D_{50}$) of at least 3.0 µm, preferably of at least 4.0 µm, more preferably of at least 4.6 µm; like in the range of 3.0 to 8.0 µm, preferably in the range of 4.0 to 7.0 µm, more preferably in the range of 4.6 to 6.0 µm.

In an embodiment the inorganic filler (F) is talc having a cut-off particle size ($D_{95}$) of at least 4.0 µm, preferably of at least 6.0 µm, more preferably of at least 8.0 µm; like in the range of 4.0 to 20.0 µm, preferably in the range of 6.0 to 15.0 µm, more preferably in the range of 8.0 to 10.0 µm.

In an embodiment the inorganic filler (F) is mica having a cut-off particle size ($D_{98}$) of at least 15.0 µm, preferably of at least 20.0 µm, more preferably of at least 25.0 µm; like in the range of 15.0 to 45.0 µm, preferably in the range of 20.0 to 40.0 µm, more preferably in the range of 25.0 to 35.0 µm.

In an embodiment the polypropylene composition (C) comprises a heterophasic propylene copolymer (HECO), a plastomer (PL) and an inorganic filler (F), wherein the inorganic filler (F) is talc having a median particle size ($D_{50}$) of at least 1.5 µm, like in the range of 1.5 to 6.0 µm and a cut-off particle size ($D_{95}$) of at least 4.0, like in the range of 4.0 to 20.0.

In an embodiment the polypropylene composition (C) comprises a heterophasic propylene copolymer (HECO), a plastomer (PL) and an inorganic filler (F), wherein the inorganic filler (F) is talc having a median particle size ($D_{50}$) of at least 2.0 µm, like in the range of 2.0 to 5.0 µm and a cut-off particle size ($D_{95}$) of at least 6.0, like in the range of 6.0 to 15.0.

In an embodiment the polypropylene composition (C) comprises a heterophasic propylene copolymer (HECO), a plastomer (PL) and an inorganic filler (F), wherein the inorganic filler (F) is talc having a median particle size ($D_{50}$) of at least 3.0 µm, like in the range of 3.0 to 4.5 µm and a cut-off particle size ($D_{95}$) of at least 8.0, like in the range of 8.0 to 10.0.

In an embodiment the polypropylene composition (C) comprises a heterophasic propylene copolymer (HECO), a plastomer (PL) and an inorganic filler (F), wherein the inorganic filler (F) is mica having a median particle size ($D_{50}$) of at least 3.0 µm, like in the range of 3.0 to 8.0 µm and a cut-off particle size ($D_{98}$) of at least 15.0, like in the range of 15.0 to 48.0.

In an embodiment the polypropylene composition (C) comprises a heterophasic propylene copolymer (HECO), a plastomer (PL) and an inorganic filler (F), wherein the inorganic filler (F) is mica having a median particle size ($D_{50}$) of at least 4.0 µm, like in the range of 4.0 to 7.0 µm and a cut-off particle size ($D_{98}$) of at least 20.0, like in the range of 20.0 to 40.0.

In an embodiment the polypropylene composition (C) comprises a heterophasic propylene copolymer (HECO), a plastomer (PL) and an inorganic filler (F), wherein the inorganic filler (F) is mica having a median particle size ($D_{50}$) of at least 4.6 µm, like in the range of 4.6 to 6.0 µm and a cut-off particle size ($D_{98}$) of at least 25.0, like in the range of 25.0 to 35.0.

In order to process the polypropylene composition, in particular if the polypropylene composition is applied in the preparation of a molded article, like an injection molded article, the polypropylene composition should exhibit a sufficient melt flow rate.

Thus, it is appreciated that the polypropylene composition (C) has a melt flow rate $MFR_2$ (230° C., 2.16 kg) measured according to ISO 1133 of at least 2 g/10 min, preferably of at least 5 g/10 min, even more preferably of at least 7 g/10 min; like in the range of 2 to 50 g/10 min, preferably in the range of 5 to 25 g/10 min, even more preferably in the range of 7 to 15.

Furthermore, the polypropylene composition should exhibit mechanical properties sufficient for the envisaged field of application.

It is appreciated that the polypropylene composition (C) has an amount of xylene cold soluble (XCS) fraction of at least 22 wt.-%, preferably of at least 25 wt.-%, more preferably of at least 28 wt.-%; like in the range of 22 to 45 wt.-%, preferably in the range of 25 to 40 wt.-%, more preferably in the range of 27 to 35 wt.-%, based on the weight of the polypropylene composition (C).

Furthermore, it is appreciated the intrinsic viscosity (IV) of the xylene soluble (XCS) fraction of the polypropylene composition (C) is at least 3.0 dl/g, preferably at least 3.1 dl/g, more preferably at least 3.2 dl/g, like in the range of 3.0 to 4.5 dl/g, preferably in the range of 3.1 to 4.0 dl/g, more preferably in the range of 3.2 to 3.8 dl/g.

In an embodiment the polypropylene composition (C) has an amount of xylene cold soluble (XCS) fraction is in the range of 22 to 45 wt.-%, based on the weight of the polypropylene composition (C), wherein the intrinsic viscosity (IV) of the xylene soluble (XCS) fraction is the range of 3.0 to 4.5 dl/g.

In an embodiment the polypropylene composition (C) has an amount of xylene cold soluble (XCS) fraction is in the range of 25 to 40 wt.-%, based on the weight of the polypropylene composition (C), wherein the intrinsic viscosity (IV) of the xylene soluble (XCS) fraction is the range of 3.1 to 4.0 dl/g.

In an embodiment the polypropylene composition (C) has an amount of xylene cold soluble (XCS) fraction is in the range of 27 to 35 wt.-%, based on the weight of the polypropylene composition (C), wherein the intrinsic viscosity (IV) of the xylene soluble (XCS) fraction is the range of 3.2 to 3.8 dl/g.

Moreover, the polypropylene composition (C) should exhibit a sufficient stiffness and impact behavior.

It is appreciated that the polypropylene composition (C) has a tensile modulus measured according to ISO 527-2 of at least 1000 MPa, preferably of at least 1300 MPa, more preferably of at least 1400 MPa; like in the range of 1000 to 3500 MPa, preferably in the range of 1300 to 3000 MPa, more preferably in the range of 1400 to 2500 MPa.

It is appreciated that the polypropylene composition (C) has a tensile stress at break measured according to ISO 527-2 of at least 5 MPa, preferably of at least 8 MPa, more preferably of at least 10 MPa; like in the range of 5 to 50 MPa, preferably in the range of 8 to 20 MPa, more preferably in the range of 10 to 15 MPa.

It is appreciated that the polypropylene composition (C) has a tensile strength at yield measured according to ISO 527-2 of at least 5 MPa, preferably of at least 10 MPa, more preferably of at least 15 MPa; like in the range of 5 to 50 MPa, preferably in the range of 10 to 30 MPa, more preferably in the range of 15 to 20 MPa.

It is appreciated that the polypropylene composition (C) has a tensile elongation at break measured according to ISO 527-2 of not more than 100%, preferably of not more than 80%, more preferably of not more than 75%, like in the range of 5 to 100%, preferably in the range of 10 to 80%, more preferably in the range of 30 to 70%.

It is appreciated that the polypropylene composition (C) has a Charpy Impact Strength (NIS+23) measured according to ISO 179-1eA:2000 at +23° C. of at least 20 kJ/m$^2$, preferably of at least 25 kJ/m$^2$, more preferably of at least 28 kJ/m$^2$; like in the range of 20 to 80 kJ/m$^2$, preferably in the range of 25 to 60 kJ/m$^2$, more preferably in the range of 28 to 52 kJ/m$^2$.

It is appreciated that the polypropylene composition (C) has a Charpy Impact Strength (NIS-20) measured according to ISO 179-1eA:2000 at −20° C. of at least 2 kJ/m$^2$, preferably of at least 4 kJ/m$^2$, more preferably of at least 5 kJ/m$^2$; like in the range of 2 to 20 kJ/m$^2$, preferably in the range of 4 to 15 kJ/m$^2$, more preferably in the range of 5 to 10 kJ/m$^2$.

In an embodiment the polypropylene composition (C) has a tensile modulus measured according to ISO 527-2 in the range of 1000 to 3500 MPa, a tensile stress at break measured according to ISO 527-2 in the range of 5 to 50 MPa, a tensile elongation at break measured according to ISO 527-2 in the range of 5 to 100%, a tensile strength at yield measured according to ISO 527-2 in the range of 5 to 50 MPa, a Charpy Impact Strength (NIS+23) measured according to ISO 179-1eA:2000 at +23° C. in the range of 20 to 80 kJ/m$^2$ and a Charpy Impact Strength (NIS-20) measured according to ISO 179-1eA:2000 at −20° C. in the range of 2 to 20 kJ/m$^2$.

In an embodiment the polypropylene composition (C) has a tensile modulus measured according to ISO 527-2 in the range of 1300 to 3000 MPa, a tensile stress at break measured according to ISO 527-2 in the range of 8 to 20 MPa, a tensile elongation at break measured according to ISO 527-2 in the range of 10 to 80%, a tensile strength at yield measured according to ISO 527-2 in the range of 10 to 30 MPa, a Charpy Impact Strength (NIS+23) measured according to ISO 179-1eA:2000 at +23° C. in the range of 25 to 60 kJ/m$^2$ and a Charpy Impact Strength (NIS-20) measured according to ISO 179-1eA:2000 at −20° C. in the range of 4 to 15 kJ/m$^2$.

In an embodiment the polypropylene composition (C) has a tensile modulus measured according to ISO 527-2 in the range of 1400 to 2500 MPa, a tensile stress at break measured according to ISO 527-2 in the range of 10 to 15 MPa, a tensile elongation at break measured according to ISO 527-2 in the range of 30 to 70%, a tensile strength at yield measured according to ISO 527-2 in the range of 15 to 20 MPa, a Charpy Impact Strength (NIS+23) measured according to ISO 179-1eA:2000 at +23° C. in the range of 28 to 52 kJ/m$^2$ and a Charpy Impact Strength (NIS-20) measured according to ISO 179-1eA:2000 at −20° C. in the range of 5 to 10 kJ/m$^2$.

The polypropylene composition (C) may not comprise other polymers besides the heterophasic propylene copolymer (HECO) and the plastomer (PL) in an amount exceeding 10 wt.-%, preferably in an amount exceeding 5 wt.-%, more preferably in an amount exceeding 2.5 wt.-%, even more preferably in an amount exceeding 0.8 wt.-%, based on the weight of the polypropylene composition (C).

In an embodiment the polypropylene composition (C) does not comprise other polymers besides the heterophasic propylene copolymer (HECO) and the plastomer (PL) in an amount exceeding 10 wt.-%, preferably in an amount exceeding 5 wt.-%, more preferably in an amount exceeding 2.5 wt.-%, even more preferably in an amount exceeding 0.8 wt.-%, based on the weight of the polypropylene composition (C).

In an embodiment the heterophasic propylene copolymer (HECO) and the plastomer (PL) are the only polymers present in the polypropylene composition (C).

In an embodiment the polypropylene composition (C) consists of the heterophasic propylene copolymer (HECO), the plastomer (PL) and the inorganic filler (F).

Herophasic Propylene Copolymer (HECO)

The polypropylene composition necessarily comprises the heterophasic propylene copolymer (HECO).

The expression "heterophasic" indicates that at least one elastomer is (finely) dispersed in a matrix. In other words, the at least one elastomer forms inclusions in the matrix. Thus, the matrix contains (finely) dispersed inclusions being not part of the matrix and said inclusions contain the at least one elastomeric copolymer. The term "inclusion" shall preferably indicate that the matrix and the inclusion form different phases within the heterophasic propylene copolymer; said inclusions are for instance visible by high resolution microscopy, like electron microscopy or scanning force microscopy.

As defined herein, a heterophasic propylene copolymer comprises as polymer components only a polypropylene matrix and an elastomeric copolymer dispersed in said polypropylene matrix.

Thus, it is appreciated that the heterophasic propylene copolymer (HECO) comprises, preferably consists of
  (a) a polypropylene matrix (M) and
  (b) an elastomeric copolymer (E) comprising units derivable from
    propylene and
    ethylene and/or $C_4$ to $C_{20}$ α-olefins, preferably from ethylene and/or $C_4$ to $C_{10}$ α-olefins, more preferably from ethylene only.

The polypropylene matrix (M) may be a random propylene copolymer (RPP) or a propylene homopolymer (HPP), the latter being especially preferred.

In an embodiment the polypropylene matrix (M) is a propylene homopolymer (HPP).

The expression propylene homopolymer relates to a polypropylene that consists substantially, i.e. of more than 99.7 wt.-%, still more preferably of at least 99.8 wt.-%, propylene units, based on the weight of the propylene homopolymer (HPP). In a preferred embodiment only propylene units are detectable in the propylene homopolymer (HPP).

In case the polypropylene matrix (M) is a propylene homopolymer (HPP) the comonomer content of the polypropylene matrix (M) may be equal or below 1.0 wt.-%, preferably equal or below 0.8 wt.-%, more preferably equal or below 0.5 wt.-%, even more preferably equal or below 0.2 wt.-%, based on the weight of the polypropylene matrix (M).

In case the polypropylene matrix (M) is a random propylene copolymer (RPP) it is appreciated that the random propylene copolymer (RPP) comprises, preferably consists of, units derivable from propylene and units derivable from ethylene and/or $C_4$ to $C_{20}$ α-olefins, preferably units derivable from propylene and units derivable from ethylene and/or $C_4$ to $C_{10}$ α-olefins, more preferably units derivable from propylene and units derivable from ethylene and/or $C_4$, $C_6$ and/or $C_8$ α-olefins.

It is appreciated that the random propylene copolymer (RPP) comprises, preferably consists of, units derivable from propylene and units derivable from ethylene, 1-butene and/or 1-hexene. More specifically, it is appreciated that the random propylene copolymer (RPP) comprises—apart from propylene—only units derivable from ethylene, 1-butene and/or 1-hexene.

In an embodiment the random propylene copolymer (RPP) consist of units derivable from propylene and units derivable from ethylene.

The second component of the heterophasic propylene copolymer (HECO) is the elastomeric copolymer (E).

The elastomeric copolymer (E) may comprise units derivable from propylene and units derivable from ethylene and/or $C_4$ to $C_{20}$ α-olefins, preferably units derivable from propylene and units derivable from ethylene and/or $C_4$ to $C_{10}$ α-olefins, more preferably units derivable from propylene and units derivable from ethylene and/or $C_4$, $C_6$ and/or $C_8$ α-olefins.

The elastomeric copolymer (E) may additionally comprise units derivable from a conjugated diene, like butadiene, or a non-conjugated diene. Suitable non-conjugated dienes, if used, include straight-chain and branched-chain acyclic dienes, such as 1,4-hexadiene, 1,5-hexadiene, 1,6-octadiene, 5-methyl-1,4-hexadiene, 3,7-dimethyl-1,6-octadiene, 3,7-dimethyl-1,7-octadiene, and the mixed isomers of dihydromyrcene and dihydroocimene, and single ring alicyclic dienes such as 1,4-cyclohexadiene, 1,5-cyclooctadiene, 1,5-cyclododecadiene, 4-vinyl cyclohexene, 1-allyl-4-isopropylidene cyclohexane, 3-allyl cyclopentene, 4-cyclohexene and 1-isopropenyl-4-(4-butenyl) cyclohexane.

However, it is preferred that the elastomeric copolymer (E) consists of units derivable from propylene and units derivable from ethylene and/or $C_4$ to $C_{20}$ α-olefins, preferably units derivable from propylene and units derivable from ethylene and/or $C_4$ to $C_{10}$ α-olefins, more preferably units derivable from propylene and units derivable from ethylene and/or $C_4$, $C_6$ and/or $C_8$ α-olefins.

As indicated above, the polypropylene composition (C) may comprise the heterophasic propylene copolymer (HECO) in an amount of 50 to 90 parts per weight, preferably 65 to 85 parts per weight, more preferably 70 to 80 parts per weight, based on the total parts by weight of the heterophasic propylene copolymer (HECO), the plastomer (PL) and the inorganic filler (F).

In an embodiment the polypropylene composition (C) comprises the heterophasic propylene copolymer (HECO) in an amount in the range of 50 to 90 wt.-%, preferably in an amount in the range of 65 to 85 wt.-%, more preferably in an amount in the range of 70 to 80 wt.-%, based on the weight of the polypropylene composition (C).

The heterophasic propylene copolymer (HECO) may comprise at least one α-nucleating agent. Furthermore, it is preferred that the heterophasic propylene copolymer (HECO) does not comprise any β-nucleating agents.

The α-nucleating agent is preferably selected from the group consisting of
(i) salts of monocarboxylic acids and polycarboxylic acids, e.g. sodium benzoate or aluminum tert-butylbenzoate, and
(ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3-trideoxy-4,6:5,7-bis-O-[(4-propylphenyl)methylene]-nonitol, and
(iii) salts of diesters of phosphoric acid, e.g. sodium 2,2'-methylenebis(4,6-di-tert-butylphenyl) phosphate or aluminium-hydroxy-bis[2,2'-methylene-bis(4,6-di-t-butylphenyl)phosphate], and
(iv) vinylcycloalkane polymer and vinylalkane polymer, and
(v) mixtures thereof.

Such α-nucleating agents are commercially available and are described, for example, in "Plastic Additives Handbook", 5th edition, 2001 of Hans Zweifel.

It is appreciated that the heterophasic propylene copolymer (HECO) comprises not more than 3000 ppm of the α-nucleating agent, preferably not more than 2000 ppm.

In an embodiment the heterophasic propylene copolymer (HECO), and thus the polypropylene composition (C), contains a vinylcycloalkane, like vinylcyclohexane (VCH), polymer and/or vinylalkane polymer, as the α-nucleating agent.

It is appreciated that the vinylcycloalkane, like vinylcyclohexane (VCH), polymer and/or vinylalkane polymer is comprised in the heterophasic propylene copolymer (HECO) in an amount of not more than more than 500 ppm, preferably in an amount of not more than 200 ppm; like in the range of 1 to 200 ppm, preferably in the range of 5 to 100 ppm, based on the weight of the heterophasic propylene copolymer (HECO).

Accordingly, it is appreciated that the polypropylene composition (C) comprises the vinylcycloalkane; like vinylcyclohexane (VCH), polymer and/or vinylalkane polymer in an amount of not more than more than 500 ppm, preferably in an amount of not more than 200 ppm, like in the range of 1 to 200 ppm, preferably in the range of 5 to 100 ppm, based on the weight of the polypropylene composition (C).

Preferably the vinylcycloalkane is a vinylcyclohexane (VCH) polymer which is introduced into the heterophasic propylene copolymer (HECO), and thus into the polypropylene composition (C), by the BNT technology.

With regard to the BNT-technology reference is made to the international applications WO 99/24478, WO 99/24479 and particularly WO 00/68315. According to this technology a catalyst system, preferably a Ziegler-Natta procatalyst, can be modified by polymerising a vinyl compound in the presence of the catalyst system, comprising in particular the special Ziegler-Natta procatalyst, an external donor and a cocatalyst, which vinyl compound has the formula:

$$CH_2=CH-CHR^3R^4$$

wherein $R^3$ and $R^4$ together form a 5- or 6-membered saturated, unsaturated or aromatic ring or independently represent an alkyl group comprising 1 to 4 carbon atoms. The modified catalyst is used for the preparation of the heterophasic, i.e. of the heterophasic propylene copolymer (HECO). The polymerized vinyl compound acts as an α-nucleating agent. The weight ratio of vinyl compound to solid catalyst component in the modification step of the catalyst is preferably of up to 5 (5:1), preferably up to 3 (3:1), like in the range of 0.5 (1:2) to 2 (2:1). The most preferred vinyl compound is vinylcyclohexane (VCH).

The nucleating agent can be introduced as a master batch. If the nucleating agent, i.e. the α-nucleating agent, which is preferably a polymeric nucleating agent, more preferably a vinylcycloalkane, like vinylcyclohexane (VCH), polymer and/or vinylalkane polymer, even more preferably vinylcyclohexane (VCH) polymer, is applied in form of a master batch, it is appreciated that the master batch comprises the nucleating agent in an amount of not more than more than 500 ppm, preferably in an amount of not more than 200 ppm; like in the range of 1 to 200 ppm, preferably in the range of 5 to 100 ppm, based on the weight of the master batch.

The heterophasic propylene copolymer (HECO) can be produced in a sequential polymerization process, i.e. in a multistage process known in the art, wherein the polypropylene matrix (M), is produced in at least in one slurry reactor and optionally in at least one gas phase reactor, and subsequently the elastomeric copolymer (E) is produced in at least one gas phase reactor, preferably in two gas phase reactors. More precisely, the heterophasic propylene copolymer (HECO) is obtained by producing a polypropylene matrix (M) in at least one reactor system comprising at least one reactor, transferring the polypropylene matrix (M) into a subsequent reactor system comprising at least one reactor, where in the elastomeric propylene copolymer (E) is produced in presence of the polypropylene matrix (M).

However, it is also possible that the heterophasic propylene copolymer (HECO), as well as its individual components (matrix phase and elastomeric phase) can be produced by blending different polymer types, i.e. polymers which differ from each other in the units from which they are derivable and/or polymers which differ from each other in their molecular weight, their comonomer content, their amount of cold soluble (XCS) fraction, their comonomer content of the xylene cold soluble (XCS) fraction and/or their intrinsic viscosity (IV) of the xylene cold soluble (XCS) fraction.

In a preferred embodiment the propylene copolymer (HECO) is prepared by blending different polymer types, preferably by melt blending different polymer types in an extruder.

The heterophasic propylene copolymer (HECO) may comprise a first heterophasic propylene copolymer (HECO1), comprising a first polypropylene matrix (M1) and a first elastomeric copolymer (E1) dispersed in the first polypropylene matrix (M1).

In this case the polypropylene matrix (M) of the heterophasic propylene copolymer (HECO) comprises the first polypropylene matrix (M1), whereas the elastomeric copolymer (E) dispersed in the polypropylene matrix (M) comprises the first elastomeric copolymer (E1).

In an embodiment the heterophasic propylene copolymer (HECO) comprises a first heterophasic propylene copolymer (HECO1), comprising a first polypropylene matrix (M1) and a first elastomeric copolymer (E1) dispersed in the first polypropylene matrix (M1).

In an embodiment the heterophasic propylene copolymer (HECO) does not comprise other polymers besides the heterophasic propylene copolymer (HECO1) in an amount exceeding 10 wt.-%, preferably in an amount exceeding 5 wt.-%, more preferably in an amount exceeding 2.5 wt.-%, even more preferably in an amount exceeding 0.8 wt.-%, based on the weight of the heterophasic propylene copolymer (HECO).

In an embodiment the heterophasic propylene copolymer (HECO1) is the only polymer present in the heterophasic propylene copolymer (HECO).

In an embodiment the heterophasic propylene copolymer (HECO) consists of the heterophasic propylene copolymer (HECO1).

The heterophasic propylene copolymer (HECO) may be multimodal, in particular, the matrix (M) and/or the elastomeric copolymer (E) of the heterophasic propylene copolymer (HECO) may be multimodal.

The expressions "multimodal" and "bimodal" refers to the modality of the polymer, i.e. the form of its molecular weight distribution curve, which is the graph of the molecular weight fraction as a function of its molecular weight and/or the form of its comonomer content distribution curve, which is the graph of the comonomer content as a function of the molecular weight of the polymer fractions, wherein the distribution curve shows at least two distinct peaks.

In an embodiment the heterophasic propylene copolymer (HECO) is multimodal in view of its molecular weight and/or its comonomer content.

In an embodiment the heterophasic propylene copolymer (HECO) is multimodal in view of its molecular weight.

In an embodiment the heterophasic propylene copolymer (HECO) is multimodal in view of its comonomer content.

In an embodiment the heterophasic propylene copolymer (HECO) is multimodal in view of its molecular weight and in view of its comonomer content.

If the heterophasic propylene copolymer (HECO) is multimodal in view of its molecular weight and/or in view of its comonomer content it is preferred that that at least the matrix (M) is multimodal in view of its molecular weight and/or than at least the elastomeric copolymer (E) is multimodal in view of its comonomer content.

The heterophasic propylene copolymer (HECO) may comprise a first heterophasic propylene copolymer (HECO1), comprising a first polypropylene matrix (M1) and a first elastomeric copolymer (E1) dispersed in the first polypropylene matrix (M1) and a second heterophasic propylene copolymer (HECO2), comprising a second polypropylene matrix (M2) and a second elastomeric copolymer (E2) dispersed in the second polypropylene matrix (M2).

In this case the polypropylene matrix (M) of the heterophasic propylene copolymer (HECO) comprises the first polypropylene matrix (M1) and the second polypropylene matrix (M2) whereas the elastomeric copolymer (E) dispersed in the polypropylene matrix (M) comprises the first elastomeric copolymer (E1) and a second elastomeric copolymer (E2).

In an embodiment the heterophasic propylene copolymer (HECO) comprises a first heterophasic propylene copolymer (HECO1), comprising a first polypropylene matrix (M1) and a first elastomeric copolymer (E1) dispersed in the first polypropylene matrix (M1) and a second heterophasic propylene copolymer (HECO2), comprising a second polypropylene matrix (M2) and a second elastomeric copolymer (E2) dispersed in the second polypropylene matrix (M2), wherein the first heterophasic propylene copolymer (HECO1) differs from the second heterophasic propylene copolymer (HECO2) in the comonomer content of the xylene cold soluble (XCS) fraction and/or the intrinsic viscosity (IV) of the xylene cold soluble (XCS) fraction.

In this case the heterophasic propylene copolymer (HECO1) and the heterophasic propylene copolymer (HECO2) together may fulfil in-equation (I), preferably in-equation (Ia), more preferably in-equation (Ib):

$$C_x(XCS)[HECO1]/C_x(XCS)[HECO2]>1.0 \quad (I)$$

$$3.0>C_x(XCS)[HECO1]/C_x(XCS)[HECO2]>1.0 \quad (Ia)$$

$$2.0>C_x(XCS)[HECO1]/C_x(XCS)[HECO2]>1.5 \quad (Ib)$$

wherein
$C_x$ (XCS) [HECO1] is the comonomer content of the xylene cold soluble (XCS) fraction of the heterophasic propylene copolymer (HECO1);
$C_x$ (XCS) [HECO2] is the comonomer content of the xylene cold soluble (XCS) fraction of the heterophasic propylene copolymer (HECO2).

Furthermore, the heterophasic propylene copolymer (HECO1) and the heterophasic propylene copolymer (HECO2) together may, alternatively or additionally, fulfil in-equation (II), preferably in-equation (IIa), more preferably in-equation (IIb).

$$IV(XCS)[HECO2]/IV(XCS)[HECO1]>1.0 \quad (II)$$

$$2.7>IV(XCS)[HECO2]/IV(XCS)[HECO1]>1.0 \quad (IIa)$$

$$2.5>IV(XCS)[HECO1]/IV(XCS)[HECO2]>1.2 \quad (IIb)$$

wherein
IV (XCS) [HECO1] is the intrinsic viscosity (IV) of the xylene cold soluble (XCS) fraction of the heterophasic propylene copolymer (HECO1);
IV (XCS) [HECO2] is the intrinsic viscosity (IV) of the xylene cold soluble (XCS) fraction of the heterophasic propylene copolymer (HECO2).

In other words, it is appreciated that the heterophasic propylene copolymer (HECO1) has a xylene cold soluble (XCS) fraction with a higher comonomer content compared to the comonomer content of the xylene cold soluble (XCS) fraction of the heterophasic propylene copolymer (HECO2) and/or that the heterophasic propylene copolymer (HECO1) has a xylene cold soluble (XCS) fraction with a lower intrinsic viscosity compared to the intrinsic viscosity of the of the xylene cold soluble (XCS) fraction of the heterophasic propylene copolymer (HECO2).

The heterophasic propylene copolymer (HECO) may not comprise other polymers besides the heterophasic propylene copolymer (HECO1) and the heterophasic propylene copolymer (HECO2) in an amount exceeding 10 wt.-%, preferably in an amount exceeding 5 wt.-%, more preferably in an amount exceeding 2.5 wt.-%, even more preferably in an amount exceeding 0.8 wt.-%, based on the weight of the heterophasic propylene copolymer (HECO).

In an embodiment the heterophasic propylene copolymer (HECO) does not comprise other polymers besides the heterophasic propylene copolymer (HECO1) and the heterophasic propylene copolymer (HECO2) in an amount exceeding 10 wt.-%, preferably in an amount exceeding 5 wt.-%, more preferably in an amount exceeding 2.5 wt.-%, even more preferably in an amount exceeding 0.8 wt.-%, based on the weight of the heterophasic propylene copolymer (HECO).

In an embodiment the heterophasic propylene copolymer (HECO1) and heterophasic propylene copolymer (HECO2) are the only polymers present in the heterophasic propylene copolymer (HECO).

In an embodiment the heterophasic propylene copolymer (HECO) consists of the heterophasic propylene copolymer (HECO1) and the heterophasic propylene copolymer (HECO2).

However, the heterophasic propylene copolymer (HECO) may comprise a first heterophasic propylene copolymer (HECO1), comprising a first polypropylene matrix (M1) and a first elastomeric copolymer (E1) dispersed in the first polypropylene matrix (M1), a second heterophasic propylene copolymer (HECO2), comprising a second polypropylene matrix (M2) and a second elastomeric copolymer (E2) dispersed in the second polypropylene matrix (M2) and additionally a third heterophasic propylene copolymer (HECO3), comprising a third polypropylene matrix (M3) and a third elastomeric copolymer (E3) dispersed in the third polypropylene matrix (M3), In this case the polypropylene matrix (M) of the heterophasic propylene copolymer (HECO) comprises the first polypropylene matrix (M1), the second polypropylene matrix (M2) and the third polypropylene matrix (M3), whereas the elastomeric copolymer (E) dispersed in the polypropylene matrix (M) comprises the first elastomeric copolymer (E1), the second elastomeric copolymer (E2) and the third elastomeric copolymer (E3).

In an embodiment the heterophasic propylene copolymer (HECO) comprises a first heterophasic propylene copolymer (HECO1), comprising a first polypropylene matrix (M1) and a first elastomeric copolymer (E1) dispersed in the first polypropylene matrix (M1), a second heterophasic propylene copolymer (HECO2), comprising a second polypropylene matrix (M2) and a second elastomeric copolymer (E2) dispersed in the second polypropylene matrix (M2) and a third heterophasic propylene copolymer (HECO3), comprising a third polypropylene matrix (M3) and a third elastomeric copolymer (E3) dispersed in the third polypropylene matrix (M3), wherein
 (a) the first heterophasic propylene copolymer (HECO1) differs from the second heterophasic propylene copolymer (HECO2) in the comonomer content of the xylene cold soluble (XCS) fraction and/or the intrinsic viscosity (IV) of the xylene cold soluble (XCS) fraction; and
 (b) the heterophasic propylene copolymer (HECO3) has a higher melt flow rate $MFR_2$ (230° C., 2.16 kg) measured according to ISO 1133 than the heterophasic propylene copolymer (HECO1) and the heterophasic propylene copolymer (HECO2) respectively.

In this case the heterophasic propylene copolymer (HECO1) and the heterophasic propylene copolymer (HECO2) together may fulfil in-equation (I), preferably in-equation (Ia), more preferably in-equation (Ib):

$$C_x(XCS)[HECO1]/C_x(XCS)[HECO2]>1.0 \quad (I);$$

$$3.0>C_x(XCS)[HECO1]/C_x(XCS)[HECO2]>1.0 \quad (Ia);$$

$$2.0>C_x(XCS)[HECO1]/C_x(XCS)[HECO2]>1.5 \quad (Ib);$$

wherein

C$_x$ (XCS) [HECO1] is the comonomer content of the xylene cold soluble (XCS) fraction of the heterophasic propylene copolymer (HECO1);

C$_x$ (XCS) [HECO2] is the comonomer content of the xylene cold soluble (XCS) fraction of the heterophasic propylene copolymer (HECO2);

In this case the heterophasic propylene copolymer (HECO1) and the heterophasic propylene copolymer (HECO2) together may fulfil in-equation (II), preferably in-equation (IIa), more preferably in-equation (IIb):

$$IV(XCS)[HECO2]/IV(XCS)[HECO1]>1.0 \qquad (II)$$

$$2.7>IV(XCS)[HECO2]/IV(XCS)[HECO1]>1.0 \qquad (IIa)$$

$$2.5>IV(XCS)[HECO1]/IV(XCS)[HECO2]>1.2 \qquad (IIb)$$

wherein

IV (XCS) [HECO1] is the intrinsic viscosity (IV) of the xylene cold soluble (XCS) fraction of the heterophasic propylene copolymer (HECO1);

IV (XCS) [HECO2] is the intrinsic viscosity (IV) of the xylene cold soluble (XCS) fraction of the heterophasic propylene copolymer (HECO2).

In this case the heterophasic propylene copolymer (HECO1), the heterophasic propylene copolymer (HECO2) and the heterophasic propylene copolymer (HECO3) together may fulfil in-equation (III), preferably in-equation (IIIa), more preferably in-equation (IIIb):

$$2 \times MFR[HECO3]/MFR[HECO1]+MFR[HECO2]>1.0 \qquad (III)$$

$$6.0>2 \times MFR[HECO3]/MFR[HECO1]+MFR[HECO2]>1.0 \qquad (IIIa)$$

$$4.0>2 \times MFR[HECO3]/MFR[HECO1]+MFR[HECO2]>1.5 \qquad (IIIb)$$

wherein

MFR [HECO1] is the melt flow rate MFR$_2$ (230° C., 2.16 kg) measured according to ISO 1133 of the heterophasic propylene copolymer (HECO1);

MFR [HECO2] is the melt flow rate MFR2 (230° C., 2.16 kg) measured according to ISO 1133 of the heterophasic propylene copolymer (HECO2); and MFR [HECO2] is the melt flow rate MFR$_2$ (230° C., 2.16 kg) measured according to ISO 1133 of the heterophasic propylene copolymer (HECO3).

In other words, it is appreciated that the heterophasic propylene copolymer (HECO1) has a xylene cold soluble (XCS) fraction with a higher comonomer content compared to the comonomer content of the xylene cold soluble (XCS) fraction of the heterophasic propylene copolymer (HECO2) and/or that the heterophasic propylene copolymer (HECO1) has a xylene cold soluble (XCS) fraction with a lower intrinsic viscosity compared to the intrinsic viscosity of the of the xylene cold soluble (XCS) fraction of the heterophasic propylene copolymer (HECO2).

Furthermore, it is appreciated that the heterophasic propylene copolymer (HECO3) has a higher melt flow rate MFR2 (230° C., 2.16 kg) measured according to ISO 1133 compared to the heterophasic propylene copolymer (HECO1) and the heterophasic propylene copolymer (HECO2) respectively.

The heterophasic propylene copolymer (HECO) may not comprise other polymers besides the heterophasic propylene copolymer (HECO1), the heterophasic propylene copolymer (HECO2) and the heterophasic propylene copolymer (HECO2) in an amount exceeding 10 wt.-%, preferably in an amount exceeding 5 wt.-%, more preferably in an amount exceeding 2.5 wt.-%, even more preferably in an amount exceeding 0.8 wt.-%, based on the weight of the heterophasic propylene copolymer (HECO).

In an embodiment the heterophasic propylene copolymer (HECO) does not comprise other polymers besides the heterophasic propylene copolymer (HECO1), the heterophasic propylene copolymer (HECO2) and the heterophasic propylene copolymer (HECO3) in an amount exceeding 10 wt.-%, preferably in an amount exceeding 5 wt.-%, more preferably in an amount exceeding 2.5 wt.-%, even more preferably in an amount exceeding 0.8 wt.-%, based on the weight of the heterophasic propylene copolymer (HECO).

In an embodiment the heterophasic propylene copolymer (HECO1), the heterophasic propylene copolymer (HECO2) and the heterophasic propylene copolymer (HECO3) are the only polymers present in the heterophasic propylene copolymer (HECO).

In an embodiment the heterophasic propylene copolymer (HECO) consists of the heterophasic propylene copolymer (HECO1), the heterophasic propylene copolymer (HECO2) and the heterophasic propylene copolymer (HECO3).

Heterophasic Propylene Copolymer (HECO1)

The heterophasic polypropylene copolymer (HECO) may comprise the heterophasic polypropylene copolymer (HECO1) as the only heterophasic propylene copolymer. The heterophasic polypropylene copolymer (HECO) may not comprise any other heterophasic polypropylene copolymer besides the heterophasic polypropylene copolymer (HECO1).

The heterophasic polypropylene copolymer (HECO) may consist of the heterophasic polypropylene copolymer (HECO1), however, this does not exclude the presence of additives (AD) as described in detail below.

The heterophasic polypropylene copolymer (HECO) may comprise the heterophasic polypropylene copolymer (HECO1) and the heterophasic polypropylene copolymer (HECO2) as the only heterophasic propylene copolymers.

The heterophasic polypropylene copolymer (HECO) may not comprise any other heterophasic polypropylene copolymer besides the heterophasic polypropylene copolymer (HECO1) and the heterophasic polypropylene copolymer (HECO2).

The heterophasic polypropylene copolymer (HECO) may consist of the heterophasic polypropylene copolymer (HECO1) and the heterophasic polypropylene copolymer (HECO2), however, this does not exclude the presence of additives (AD) as described in detail below.

If the heterophasic polypropylene copolymer (HECO) comprises the first heterophasic polypropylene copolymer (HECO1) and the second heterophasic polypropylene copolymer (HECO2) as the only heterophasic propylene copolymer compounds it is appreciated that the heterophasic propylene copolymer (HECO) comprises the heterophasic propylene copolymer (HECO1) in an amount of at least 70 parts per weight, preferably in an amount of at least 80 parts per weight, more preferably in an amount of at least 85 parts per weight; like in an amount in the range of 70 to 98 parts per weight, preferably in an amount in the range of 80 to 95 parts per weight, more preferably in an amount in the range of 88 to 94 parts per weight, based on the total parts per weight of the heterophasic polypropylene copolymer (HECO1) and the heterophasic polypropylene copolymer (HECO2).

If the heterophasic polypropylene copolymer (HECO) comprises the first heterophasic polypropylene copolymer (HECO1) and the second heterophasic polypropylene copolymer (HECO2) as the only heterophasic propylene copolymer compounds it is appreciated that the heterophasic propylene copolymer (HECO) comprises the heterophasic propylene copolymer (HECO1) in an amount of at least 70 wt.-%, preferably in an amount of at least 80 wt.-%, more preferably in an amount of at least 85 wt.-%; like in an amount in the range of 70 to 98 wt.-%, preferably in an amount in the range of 80 to 95 wt.-%, more preferably in an amount in the range of 88 to 94 wt.-%, based on the weight of the heterophasic polypropylene copolymer (HECO).

If the heterophasic polypropylene copolymer (HECO) comprises the first heterophasic polypropylene copolymer (HECO1) and the second heterophasic polypropylene copolymer (HECO2) as the only heterophasic propylene copolymer compounds it is appreciated that the heterophasic propylene copolymer (HECO) comprises the heterophasic propylene copolymer (HECO2) in an amount of not more than 30 wt.-%, preferably in an amount of not more than 20 wt.-%, more preferably in an amount of not more than 15 wt.-%; like in an amount in the range of 2 to 30 wt.-%, preferably in an amount in the range of 5 to 20 wt.-%, more preferably in an amount in the range of 6 to 12 wt.-%, based on the weight of the heterophasic polypropylene copolymer (HECO).

The heterophasic polypropylene copolymer (HECO) may comprise the heterophasic polypropylene copolymer (HECO1), the heterophasic polypropylene copolymer (HECO2) and the heterophasic polypropylene copolymer (HEC03) as the only heterophasic propylene copolymers.

The heterophasic polypropylene copolymer (HECO) may not comprise any other heterophasic polypropylene copolymer besides the heterophasic polypropylene copolymer (HECO1), the heterophasic polypropylene copolymer (HECO2) and the heterophasic polypropylene copolymer (HECO3).

The heterophasic polypropylene copolymer (HECO) may consist of the heterophasic polypropylene copolymer (HECO1), the heterophasic polypropylene copolymer (HECO2) and the heterophasic polypropylene copolymer (HECO3), however, this does not exclude the presence of additives) as described in detail below.

If the heterophasic polypropylene copolymer (HECO) comprises the first heterophasic polypropylene copolymer (HECO1), the second heterophasic polypropylene copolymer (HECO2) and the third heterophasic polypropylene copolymer (HECO3) as the only heterophasic propylene copolymer compounds, it is appreciated, that the heterophasic propylene copolymer (HECO) comprises the heterophasic propylene copolymer (HECO1) in an amount of not more than 30 parts per weight, preferably in an amount of not more than 25 parts per weight, more preferably in an amount of not more than 23 parts per weight; like in an amount in the range of 5 to 30 parts per weight, preferably in an amount in the range of 10 to 25 parts per weight, more preferably in an amount in the range of 15 to 23 parts per weight, based on the total parts per weight of the heterophasic polypropylene copolymer (HECO1), the heterophasic polypropylene copolymer (HECO2) and the heterophasic polypropylene copolymer (HECO3).

If the heterophasic polypropylene copolymer (HECO) comprises the heterophasic polypropylene copolymer (HECO1) the heterophasic polypropylene copolymer (HECO2) and the heterophasic polypropylene copolymer (HECO3) as the only heterophasic propylene copolymer compounds it is appreciated that the heterophasic propylene copolymer (HECO) comprises the heterophasic propylene copolymer (HECO1) in an amount of not more than 30 wt.-%, preferably in an amount of not more than 25 wt.-%, more preferably in an amount of not more than 23 wt.-%; like in an amount in the range of 5 to 30 wt.-%, preferably in an amount in the range of 10 to 25 wt.-%, more preferably in an amount in the range of 15 to 23 wt.-%, based on the weight of the heterophasic propylene copolymer (HECO).

If the heterophasic polypropylene copolymer (HECO) comprises the heterophasic polypropylene copolymer (HECO1), the heterophasic polypropylene copolymer (HECO2) and the heterophasic polypropylene copolymer (HECO3) as the only heterophasic propylene copolymer compounds it is appreciated that the heterophasic propylene copolymer (HECO) comprises the heterophasic propylene copolymer (HECO2) in an amount of not more than 30 wt.-%, preferably in an amount of not more than 20 wt.-%, more preferably in an amount of not more than 17 wt.-%; like in an amount in the range of 5 to 30 wt.-%, preferably in an amount in the range of 7 to 20 wt.-%, more preferably in an amount in the range of 10 to 17 wt.-%, based on the weight of the heterophasic propylene copolymer (HECO).

If the heterophasic polypropylene copolymer (HECO) comprises the heterophasic polypropylene copolymer (HECO1), the heterophasic polypropylene copolymer (HECO2) and the heterophasic polypropylene copolymer (HECO3) as the only heterophasic propylene copolymer compounds it is appreciated that the heterophasic propylene copolymer (HECO) comprises the heterophasic propylene copolymer (HECO3) in an amount of at least 40 wt.-%, preferably in an amount of at least 55 wt.-%, more preferably in an amount of at least 60 wt.-%; like in an amount in the range of 40 to 90 wt.-%, preferably in an amount in the range of 55 to 83 wt.-%, more preferably in an amount in the range of 60 to 75 wt.-%, based on the weight of the heterophasic propylene copolymer (HECO).

As indicated above, it is appreciated that the heterophasic propylene copolymer (HECO1) comprises, preferably consists of
(a) a polypropylene matrix (M1) and
(b) an elastomeric copolymer (E1) comprising units derived from
propylene and
ethylene and/or $C_4$ to $C_{20}$ α-olefins, preferably from ethylene and/or $C_4$ to $C_{10}$ α-olefins, more preferably from ethylene only.

The polypropylene matrix (M1) may be a random propylene copolymer (RPP1) or a propylene homopolymer (HPP1), the latter being especially preferred.

In an embodiment the polypropylene matrix (M1) is a propylene homopolymer (HPP1).

In case the polypropylene matrix (M1) is a propylene homopolymer (HPP1) the comonomer content of the polypropylene matrix (M1) may be equal or below 1.0 wt.-%, preferably equal or below 0.8 wt.-%, more preferably equal or below 0.5 wt.-%, even more preferably equal or below 0.2 wt.-%, based on the weight of the polypropylene matrix (M1).

In case the polypropylene matrix (M1) is a random propylene copolymer (RPP1) it is appreciated that the random propylene copolymer (RPP1) comprises, preferably consists of, units derivable from propylene and units derivable from ethylene and/or $C_4$ to $C_{20}$ α-olefins, preferably units derivable from propylene and units derivable from ethylene and/or $C_4$ to $C_{10}$ α-olefins, more preferably units derivable from propylene and units derivable from ethylene and/or $C_4$, $C_6$ and/or $C_8$ α-olefins, even more preferably units derivable from propylene and units derivable from ethylene only.

It is appreciated that the random propylene copolymer (RPP1) comprises, preferably consists of, units derivable from propylene and units derivable from ethylene 1-butene and/or 1-hexene. More specifically it is appreciated that the random propylene copolymer (RPP1) comprises—apart from propylene—only units derivable from ethylene 1-butene and/or 1-hexene.

In an embodiment the random propylene copolymer (RPP1) consist of units derivable from propylene and units derivable from ethylene.

The second component of the heterophasic propylene copolymer (HECO1) is the elastomeric copolymer (E1).

The elastomeric copolymer (E1) may comprise units derivable from propylene and units derivable from ethylene and/or $C_4$ to $C_{20}$ α-olefins, preferably units derivable from propylene and units derivable from ethylene and/or $C_4$ to $C_{10}$ α-olefins, more preferably units derivable from propylene and units derivable from ethylene and/or $C_4$, $C_6$ and/or $C_8$ α-olefins. The elastomeric copolymer (E1) may additionally comprise units derived from a conjugated diene; like butadiene, or a non-conjugated diene. Suitable non-conjugated dienes, if used, include straight-chain and branched-chain acyclic dienes, such as 1,4-hexadiene, 1,5-hexadiene, 1,6-octadiene, 5-methyl-1,4-hexadiene, 3,7-dimethyl-1,6-octadiene, 3,7-dimethyl-1,7-octadiene, and the mixed isomers of dihydromyrcene and dihydro-ocimene, and single ring alicyclic dienes such as 1,4-cyclohexadiene, 1,5-cyclooctadiene, 1,5-cyclododecadiene, 4-vinyl cyclohexene, 1-allyl-4-isopropylidene cyclohexane, 3-allyl cyclopentene, 4-cyclohexene and 1-isopropenyl-4-(4-butenyl) cyclohexane. However, it is preferred that the elastomeric copolymer (E1) consists of units derivable from propylene and units derivable from ethylene and/or $C_4$ to $C_{20}$ α-olefins, preferably units derivable from propylene and units derivable from ethylene and/or $C_4$ to $C_{10}$ α-olefins, more preferably units derivable from propylene and units derivable from ethylene and/or $C_4$, $C_6$ and/or $C_8$ α-olefins.

In an embodiment the elastomeric copolymer (E1) consists of units derivable from propylene and ethylene.

The heterophasic propylene copolymer (HECO1) may comprise at least one α-nucleating agent. Furthermore, it is preferred that the heterophasic propylene copolymer (HECO1) does not comprise any β-nucleating agents.

Obviously, the disclosure on suitable and preferred α-nucleating agents provided above in conjunction with the heterophasic propylene copolymer (HECO) also applies to the α-nucleating agents which may be comprised in the heterophasic propylene copolymer (HECO1) and explicit reference is made to this passage.

The heterophasic propylene copolymer (HECO1), as well as its individual components (matrix phase and elastomeric phase) can be produced by blending different polymer types.

However, it is appreciated that the heterophasic propylene copolymer (HECO1) is produced in a sequential polymerization process, i.e. in a multistage process known in the art, wherein the polypropylene matrix (M1), is produced in at least in one slurry reactor and optionally in at least one gas phase reactor, and subsequently the elastomeric copolymer (E1) is produced in at least one gas phase reactor, preferably in two gas phase reactors. More precisely, the heterophasic propylene copolymer (HECO1) is obtained by producing a polypropylene matrix (M1) in at least one reactor system comprising at least one reactor, transferring the polypropylene matrix (M1) into a subsequent reactor system comprising at least one reactor, where in the elastomeric propylene copolymer (E1) is produced in presence of the polypropylene matrix (M1).

In an embodiment the heterophasic propylene copolymer (HECO1) is produced in a sequential polymerization process, wherein the polypropylene matrix (M1) is produced in a first reactor system comprising a slurry reactor (SL) and a first gas phase reactor (GPR1). Subsequently the polypropylene matrix (M1) is transferred into a second reactor system comprising a second gas phase reactor (GPR2) and a third gas phase reactor (GPR3), wherein the elastomeric copolymer (E1) is produced in presence of the polypropylene matrix (M1).

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315. A further suitable slurry-gas phase process is the Spheripol® process of Basell.

The heterophasic propylene copolymer (HECO1) is prepared in the presence of a catalyst system. Suitable catalyst systems are known to the person skilled in the art and are selected according to needs, however, it is appreciated that a Ziegler-Natta catalyst system is applied. Suitable Ziegler-Natta catalyst system are for example described in WO2014/023603, EP591224, WO2012/007430, EP2610271, EP 261027 and EP2610272.

The heterophasic propylene copolymer (HECO1) comprises the polypropylene matrix (M1) and the elastomeric copolymer (E1) dispersed in the polypropylene matrix (M1).

It is appreciated that the heterophasic propylene copolymer (HECO1) comprises the polypropylene matrix (M1) in an amount in the range of 55 to 80 wt.-%, preferably in an amount in the range of 60 to 70 wt.-%, based on the weight of the heterophasic propylene copolymer (HECO1).

Furthermore, it is appreciated that the heterophasic propylene copolymer (HECO1) comprises the elastomeric copolymer (E1) in an amount in the range of 20 to 45 wt.-%, preferably in an amount in the range of 30 to 40 wt.-%, based on the weight of the heterophasic propylene copolymer (HECO1).

As indicated above the melt flow rate of the polypropylene matrix (M1) is an important factor determining the properties of the polypropylene composition (C). It is appreciated that the polypropylene matrix (M1) has a melt flow rate MFR2 (230° C., 2.16 kg) measured according to ISO 1133 of not more 100 g/10 min, preferably not more than 80 g/10 min, more preferably not more than 70 g/10 min, even more preferably not more than 60 g/10 min; like in the range of 5.0 to 100 g/10 min, preferably in the range of 10 to 80 g/10 min, more preferably in the range of 20 to 70 g/10 min, even more preferably in the range of 45 to 65 g/10 min.

In an embodiment the polypropylene matrix (M1) is a propylene homopolymer (HPP1).

In an embodiment the polypropylene matrix (M1) has a melt flow rate MFR2 (230° C., 2.16 kg) measured according to ISO 1133 in the range of 20 to 70 g/10 min.

In a preferred embodiment the polypropylene matrix (M1) is a propylene homopolymer (HPP1) having a melt flow rate $MFR_2$ (230° C., 2.16 kg) measured according to ISO 1133 in the range of 20 to 70 g/10 min.

The heterophasic propylene copolymer (HECO1) may have a melt flow rate $MFR_2$ (230° C., 2.16 kg) measured according to ISO 1133 of not more 40 g/10 min, preferably not more than 25 g/10 min, more preferably not more than 15 g/10 min; like in the range of 1 to 40 g/10 min, preferably in the range of 5 to 25 g/10 min, more preferably in the range of 8 to 15 g/10 min.

The heterophasic polypropylene copolymer (HECO1) may have may have a total comonomer content of not more than 40 mol %, preferably not more than 30 mol %, more preferably not more than 25 mol %; like in the range of 5.0 to 40 mol %, preferably in the range of 10 to 30 mol %, more preferably in the range of 15 to 25 mol %.

The heterophasic polypropylene (HECO1) may have a content of xylene cold soluble (XCS) fraction of not more than 55 wt.-%, preferably not more than 45 wt.-%, more preferably not more than 38 wt.-%; like in the range of 10 to 55 wt.-%, preferably in the range of 20 to 45 wt.-%, more preferably in the range of 25 to 38 wt.-%, based on the total weight of the heterophasic polypropylene (HECO1).

The heterophasic polypropylene (HECO1) may have an intrinsic viscosity (IV) of the xylene cold soluble (XCS) fraction of not more than 4.0 dl/g, preferably of not more than 3.8 dl/g, more preferably of not more than 3.6 dl/g, even more preferably of not more than 3.5 dl/g; like in the range of 2.0 to 4.0 dl/g, preferably in the range of 2.5 to 3.8 dl/g, more preferably in the range of 3.0 to 3.6 dl/g, even more preferably in the range of 3.2 to 3.5 dl/g.

The heterophasic polypropylene (HECO1) may have a comonomer content of the xylene cold soluble (XCS) fraction of not more than 65 mol %, preferably not more than 60 mol %, more preferably not more than 50 mol %; like in the range of 30 to 65 mol %, preferably in the range of 35 to 60 wt.-%, more preferably in the range of 45 to 52 mol %.

In an embodiment the heterophasic polypropylene (HECO1) has a melt flow rate $MFR_2$ (230° C., 2.16 kg) measured according to ISO 1133 in the range of 1.0 to 50 g/10 min, a total comonomer content in the range of 5.0 to 40 mol %, a content of xylene cold soluble (XCS) fraction in the range of 10 to 55 wt.-%, based on the weight of the heterophasic polypropylene (HECO1), an intrinsic viscosity (IV) of the xylene cold soluble (XCS) fraction in the range of 2.0 to 3.5 dl/g, and a comonomer content of the xylene cold soluble (XCS) fraction in the range of 30 to 65 mol %.

In an embodiment the heterophasic polypropylene (HECO1) has a melt flow rate $MFR_2$ (230° C., 2.16 kg) measured according to ISO 1133 in the range of 3.0 to 30 g/10 min, a total comonomer content in the range of 10 to 30 mol %, a content of xylene cold soluble (XCS) fraction in the range of 20 to 45 wt.-%, based on the weight of the heterophasic polypropylene (HECO1), an intrinsic viscosity (IV) of the xylene cold soluble (XCS) fraction in the range of 2.5 to 3.4 dl/g, and a comonomer content of the xylene cold soluble (XCS) fraction in the range of 35 to 60 mol %.

In an embodiment the heterophasic polypropylene (HECO1) has a melt flow rate $MFR_2$ (230° C., 2.16 kg) measured according to ISO 1133 in the range of 3.0 to 30 g/10 min, a total comonomer content in the range of 10 to 30 mol %, a content of xylene cold soluble (XCS) fraction in the range of 20 to 45 wt.-%, based on the weight of the heterophasic polypropylene (HECO1), an intrinsic viscosity (IV) of the xylene cold soluble (XCS) fraction in the range of 2.9 to 3.2 dl/g, and a comonomer content of the xylene cold soluble (XCS) fraction in the range of 35 to 60 mol %.

Heterophasic Propylene Copolymer (HECO2)

The heterophasic polypropylene copolymer (HECO) may comprise the heterophasic polypropylene copolymer (HECO1) and the heterophasic polypropylene copolymer (HECO2) as the only heterophasic propylene copolymers.

The heterophasic polypropylene copolymer (HECO) may not comprise any other heterophasic polypropylene copolymer besides the heterophasic polypropylene copolymer (HECO1) and the heterophasic polypropylene copolymer (HECO2).

The heterophasic polypropylene copolymer (HECO) may consist of the heterophasic polypropylene copolymer (HECO1) and the heterophasic polypropylene copolymer (HECO2), however, this does not exclude the presence of additives (as described in detail below).

If the heterophasic polypropylene copolymer (HECO) comprises the first heterophasic polypropylene copolymer (HECO1) and the second heterophasic polypropylene copolymer (HECO2) as the only heterophasic propylene copolymer compounds it is appreciated that the heterophasic propylene copolymer (HECO) comprises the heterophasic propylene copolymer (HECO2) in an amount not more than 30 parts per weight, preferably in an amount of not more than 20 parts per weight, more preferably in an amount of not more than 15 parts per weight; like in an amount in the range of 2 to 30 parts per weight, preferably in an amount in the range of 5 to 20 parts per weight, more preferably in an amount in the range of 6 to 12 parts per weight, based on the total parts per weight of the heterophasic polypropylene copolymer (HECO1) and the heterophasic polypropylene copolymer (HECO2).

If the heterophasic polypropylene copolymer (HECO) comprises the first heterophasic polypropylene copolymer (HEC01) and the second heterophasic polypropylene copolymer (HECO2) as the only heterophasic propylene copolymer compounds it is appreciated that the heterophasic propylene copolymer (HECO) comprises the heterophasic propylene copolymer (HECO1) in an amount of at least 70 wt.-%, preferably in an amount of at least 80 wt.-%, more preferably in an amount of at least 85 wt.-%; like in an amount in the range of 70 to 98 wt.-%, preferably in an amount in the range of 80 to 95 wt.-%, more preferably in an amount in the range of 88 to 94 wt.-%, based on the weight of the heterophasic polypropylene copolymer (HECO).

If the heterophasic polypropylene copolymer (HECO) comprises the first heterophasic polypropylene copolymer (HECO1) and the second heterophasic polypropylene copolymer (HECO2) as the only heterophasic propylene copolymer compounds it is appreciated that the heterophasic propylene copolymer (HECO) comprises the heterophasic propylene copolymer (HECO2) in an amount of not more than 30 wt.-%, preferably in an amount of not more than 20 wt.-%, more preferably in an amount of not more than 15 wt.-%; like in an amount in the range of 2 to 30 wt.-%, preferably in an amount in the range of 5 to 20 wt.-%, more preferably in an amount in the range of 6 to 12 wt.-%, based on the weight of the heterophasic polypropylene copolymer (HECO).

In an embodiment the heterophasic polypropylene copolymer (HECO) comprises the first heterophasic polypropylene copolymer (HECO1) and the second heterophasic polypropylene copolymer (HECO2), wherein the heterophasic polypropylene copolymer (HECO1) is present in an amount of 70 to 98 wt.-% and the heterophasic polypropylene copolymer (HECO2) is present in an amount of 2 to 30 wt.-%, based on the total weight of the heterophasic polypropylene copolymer (HECO).

In an embodiment the heterophasic polypropylene copolymer (HECO) comprises the first heterophasic polypropylene copolymer (HECO1) and the second heterophasic polypropylene copolymer (HECO2), wherein the heterophasic polypropylene copolymer (HECO1) is present in an amount of 80 to 95 wt.-% and the heterophasic polypropylene copolymer (HECO2) is present in an amount of 5 to 20 wt.-%, based on the total weight of the heterophasic polypropylene copolymer (HECO).

In an embodiment the heterophasic polypropylene copolymer (HECO) comprises the first heterophasic polypropylene copolymer (HECO1) and the second heterophasic polypropylene copolymer (HECO2), wherein the heterophasic polypropylene copolymer (HECO1) is present in an amount of 88 to 94 wt.-% and the heterophasic polypropylene copolymer (HECO2) is present in an amount of 6 to 12 wt.-%, based on the total weight of the heterophasic polypropylene copolymer (HECO).

The heterophasic polypropylene copolymer (HECO) may comprise the heterophasic polypropylene copolymer (HECO1), the heterophasic polypropylene copolymer (HECO2) and the heterophasic polypropylene copolymer (HECO3) as the only heterophasic propylene copolymers.

The heterophasic polypropylene copolymer (HECO) may not comprise any other heterophasic polypropylene copolymer besides the heterophasic polypropylene copolymer (HECO1), the heterophasic polypropylene copolymer (HECO2) and the heterophasic polypropylene copolymer (HECO3).

The heterophasic polypropylene copolymer (HECO) may consist of the heterophasic polypropylene copolymer (HECO1), the heterophasic polypropylene copolymer (HECO2) and the heterophasic polypropylene copolymer (HECO3), however, this does not exclude the presence of additives (AD) as described in detail below.

If the heterophasic polypropylene copolymer (HECO) comprises the first heterophasic polypropylene copolymer (HECO1), the second heterophasic polypropylene copolymer (HECO2) and the third heterophasic polypropylene copolymer (HECO3) as the only heterophasic propylene copolymer compounds, it is appreciated, that the heterophasic propylene copolymer (HECO) comprises the heterophasic propylene copolymer (HECO2) in an amount of not more than 30 parts per weight, preferably in an amount of not more than 20 parts per weight, more preferably in an amount of not more than 17 parts per weight; like in an amount in the range of 5 to 30 parts per weight, preferably in an amount in the range of 7 to 25 parts per weight, more preferably in an amount in the range of 10 to 17 parts per weight, based on the total parts per weight of the heterophasic polypropylene copolymer (HECO1), the heterophasic polypropylene copolymer (HECO2) and the heterophasic polypropylene copolymer (HECO3).

If the heterophasic polypropylene copolymer (HECO) comprises the heterophasic polypropylene copolymer (HECO1) the heterophasic polypropylene copolymer (HECO2) and the heterophasic polypropylene copolymer (HECO3) as the only heterophasic propylene copolymer compounds it is appreciated that the heterophasic propylene copolymer (HECO) comprises the heterophasic propylene copolymer (HECO1) in an amount of not more than 30 wt.-%, preferably in an amount of not more than 25 wt.-%, more preferably in an amount of not more than 23 wt.-%; like in an amount in the range of 5 to 30 wt-%, preferably in an amount in the range of 10 to 25 wt.-%, more preferably in an amount in the range of 15 to 23 wt.-%, based on the weight of the heterophasic propylene copolymer (HECO).

If the heterophasic polypropylene copolymer (HECO) comprises the heterophasic polypropylene copolymer (HECO1), the heterophasic polypropylene copolymer (HECO2) and the heterophasic polypropylene copolymer (HECO3) as the only heterophasic propylene copolymer compounds it is appreciated that the heterophasic propylene copolymer (HECO) comprises the heterophasic propylene copolymer (HECO2) in an amount of not more than 30 wt.-%, preferably in an amount of not more than 20 wt.-%, more preferably in an amount of not more than 17 wt.-%; like in an amount in the range of 5 to 30 wt.-%, preferably in an amount in the range of 7 to 20 wt.-%, more preferably in an amount in the range of 10 to 17 wt.-%, based on the weight of the heterophasic propylene copolymer (HECO).

If the heterophasic polypropylene copolymer (HECO) comprises the heterophasic polypropylene copolymer (HECO1), the heterophasic polypropylene copolymer (HECO2) and the heterophasic polypropylene copolymer (HECO3) as the only heterophasic propylene copolymer compounds it is appreciated that the heterophasic propylene copolymer (HECO) comprises the heterophasic propylene copolymer (HECO3) in an amount of at least 40 wt.-%, preferably in an amount of at least 55 wt.-%, more preferably in an amount of at least 60 wt.-%; like in an amount in the range of 40 to 90 wt.-%, preferably in an amount in the range of 55 to 83 wt.-%, more preferably in an amount in the range of 60 to 75 wt.-%, based on the weight of the heterophasic propylene copolymer (HECO).

In an embodiment the heterophasic polypropylene copolymer (HECO) comprises the first heterophasic polypropylene copolymer (HECO1), the second heterophasic polypropylene copolymer (HECO2) and the third heterophasic polypropylene copolymer (HECO3), wherein the heterophasic polypropylene copolymer (HECO1) is present in an amount of 5 to 30 wt.-%, the heterophasic polypropylene copolymer (HECO2) is present in an amount of 5 to 30 wt.-%, and the third heterophasic polypropylene copolymer (HECO3) is present in an amount of 40 to 90 wt.-%, based on the total weight of the heterophasic polypropylene copolymer (HECO).

In an embodiment the heterophasic polypropylene copolymer (HECO) comprises the first heterophasic polypropylene copolymer (HECO1), the second heterophasic polypropylene copolymer (HECO2) and the third heterophasic polypropylene copolymer (HECO3), wherein the first heterophasic polypropylene copolymer (HECO1) is present in an amount of 10 to 25 wt.-%, the second heterophasic polypropylene copolymer (HECO2) is present in an amount of 7 to 20 wt.-%, and the third heterophasic polypropylene copolymer (HECO3) is present in an amount of 55 to 83 wt.-%, based on the total weight of the heterophasic polypropylene copolymer (HECO).

In an embodiment the heterophasic polypropylene copolymer (HECO) comprises the first heterophasic polypropylene copolymer (HECO1), the second heterophasic polypropylene copolymer (HECO2) and the third heterophasic polypropylene copolymer (HECO3), wherein the first heterophasic polypropylene copolymer (HECO1) is present in an amount of 15 to 23 wt.-%, the second heterophasic polypropylene copolymer (HECO2) is present in an amount of 10 to 17 wt.-%, and the third heterophasic polypropylene copolymer (HECO3) is present in an amount of 60 to 75 wt.-%, based on the total weight of the heterophasic polypropylene copolymer (HECO).

As indicated above, it is appreciated that the heterophasic propylene copolymer (HECO2) comprises, preferably consists of
(a) a polypropylene matrix (M2) and
(b) an elastomeric copolymer (E2) comprising units derived from propylene and ethylene and/or $C_4$ to $C_{20}$ α-olefins, preferably from ethylene and/or $C_4$ to $C_{10}$ α-olefins, more preferably from ethylene only.

The polypropylene matrix (M2) may be a random propylene copolymer (RPP2) or a propylene homopolymer (HPP2), the latter being especially preferred.

In an embodiment the polypropylene matrix (M2) is a propylene homopolymer (RPP2).

In case the polypropylene matrix (M2) is a propylene homopolymer (HPP2) the comonomer content of the polypropylene matrix (M2) may be equal or below 1.0 wt.-%, preferably equal or below 0.8 wt.-%, more preferably equal or below 0.5 wt.-%, even more preferably equal or below 0.2 wt.-%, based on the weight of the polypropylene matrix (M2).

In case the polypropylene matrix (M2) is a random propylene copolymer (RPP2) it is appreciated that the random propylene copolymer (RPP2) comprises, preferably consists of, units derivable from propylene and units derivable from ethylene and/or $C_4$ to $C_{20}$ α-olefins, preferably units derivable from propylene and units derivable from ethylene and/or $C_4$ to $C_{10}$ α-olefins, more preferably units derivable from propylene and units derivable from ethylene and/or $C_4$, $C_6$ and/or $C_8$ α-olefins.

It is appreciated that the random propylene copolymer (RPP2) comprises, preferably consists of, units derivable from propylene and units derivable from ethylene 1-butene and/or 1-hexene. More specifically it is appreciated that the random propylene copolymer (RPP2) comprises—apart from propylene—only units derivable from ethylene 1-butene and/or 1-hexene, In an embodiment the random propylene copolymer (RPP2) consist of units derivable from propylene and units derivable from ethylene.

The second component of the heterophasic propylene copolymer (HECO2) is the elastomeric copolymer (E2).

The elastomeric copolymer (E2) may comprise units derivable from propylene and units derivable from ethylene and/or $C_4$ to $C_{20}$ α-olefins, preferably units derivable from propylene and units derivable from ethylene and/or $C_4$ to $C_{10}$ α-olefins, more preferably units derivable from propylene and units derivable from ethylene and/or $C_4$, $C_6$ and/or $C_8$ α-olefins. The elastomeric copolymer (E2) may additionally comprise units derived from a conjugated diene; like butadiene, or a non-conjugated diene. Suitable non-conjugated dienes, if used, include straight-chain and branched-chain acyclic dienes, such as 1,4-hexadiene, 1,5-hexadiene, 1,6-octadiene, 5-methyl-1,4-hexadiene, 3,7-dimethyl-1,6-octadiene, 3,7-dimethyl-1,7-octadiene, and the mixed isomers of dihydromyrcene and dihydro-ocimene, and single ring alicyclic dienes such as 1,4-cyclohexadiene, 1,5-cyclooctadiene, 1,5-cyclododecadiene, 4-vinyl cyclohexene, 1-allyl-4-isopropylidene cyclohexane, 3-allyl cyclopentene, 4-cyclohexene and 1-isopropenyl-4-(4-butenyl) cyclohexane.

However, it is preferred that the elastomeric copolymer (E2) consists of units derivable from propylene and units derivable from ethylene and/or $C_4$ to $C_{20}$ α-olefins, preferably units derivable from propylene and units derivable from ethylene and/or $C_4$ to $C_{10}$ α-olefins, more preferably units derivable from propylene and units derivable from ethylene and/or $C_4$, $C_6$ and/or $C_8$ α-olefins.

In an embodiment the elastomeric copolymer (E2) consists of units derivable from propylene and ethylene.

The heterophasic propylene copolymer (HECO2) may comprise at least one α-nucleating agent. Furthermore, it is preferred that the heterophasic propylene copolymer (HECO2) does not comprise any β-nucleating agents.

Obviously, the disclosure on suitable and preferred α-nucleating agents provided above in conjunction with the heterophasic propylene copolymer (HECO) also applies to the α-nucleating agents which may be comprised in the heterophasic propylene copolymer (HECO2) and explicit reference is made to this passage.

The heterophasic propylene copolymer (HECO2), as well as its individual components (matrix phase and elastomeric phase) can be produced by blending different polymer types.

However, it is appreciated that the heterophasic propylene copolymer (HECO2) is produced in a sequential polymerization process, i.e. in a multistage process known in the art, wherein the polypropylene matrix (M2), is produced in at least in one slurry reactor and optionally in at least one gas phase reactor, and subsequently the elastomeric copolymer (E2) is produced in at least one gas phase reactor, preferably in two gas phase reactors. More precisely, the heterophasic propylene copolymer (HECO2) is obtained by producing a polypropylene matrix (M2) in at least one reactor system comprising at least one reactor, transferring the polypropylene matrix (M2) into a subsequent reactor system comprising at least one reactor, where in the elastomeric propylene copolymer (E2) is produced in presence of the polypropylene matrix (M2).

In an embodiment the heterophasic propylene copolymer (HECO2) is produced in a sequential polymerization process, wherein the polypropylene matrix (M2) is produced in a first reactor system comprising a slurry reactor (SL) and in a first gas phase reactor (GPR1). Subsequently, the polypropylene matrix (M2) is transferred into a second reactor system comprising a second gas phase reactor (GPR2) and a third gas phase reactor (GPR3), wherein the elastomeric copolymer (E2) is produced in presence of the polypropylene matrix (M2).

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315. A further suitable slurry-gas phase process is the Spheripol® process of Basell.

The heterophasic propylene copolymer (HECO2) is prepared in the presence of a catalyst system. Suitable catalyst systems are known to the person skilled in the art and are selected according to needs, however, it is appreciated that a Ziegler-Natta catalyst system is applied. Suitable Ziegler-Natta catalyst system are for example described in WO2014/023603, EP591224, WO2012/007430, EP2610271, EP 261027 and EP2610272.

The heterophasic propylene copolymer (HECO2) comprises the polypropylene matrix (M2) and the elastomeric copolymer (E2) dispersed in the polypropylene matrix (M2).

It is appreciated that the heterophasic propylene copolymer (HECO2) comprises the polypropylene matrix (M2) in an amount in the range of 55 to 80 wt.-%, preferably in an amount in the range of 60 to 80 wt.-%, based on the weight of the heterophasic propylene copolymer (HECO2).

Furthermore, it is appreciated that the heterophasic propylene copolymer (HECO2) comprises the elastomeric copolymer (E2) in an amount in the range of 20 to 45 wt.-%, preferably in an amount in the range of 20 to 40 wt.-%, based on the weight of the heterophasic propylene copolymer (HECO2).

As indicated above the melt flow rate of the polypropylene matrix (M2) is an important factor determining the properties of the polypropylene composition (C). It is appreciated that the polypropylene matrix (M2) has a melt flow rate $MFR_2$ (230° C., 2.16 kg) measured according to ISO 1133 of not more than 100 g/10 min, preferably of not more than 80 g/10 min, more preferably of not more than 70 g/10 min, even more preferably of not more than 60 g/10 min; like in the range of 5.0 to 100 g/10 min, preferably in the range of 10 to 80 g/10 min, more preferably in the range of 20 to 70 g/10 min, even more preferably in the range of 45 to 65 g/10 min.

In an embodiment the polypropylene matrix (M2) is a propylene homopolymer (HPP2).

In an embodiment the polypropylene matrix (M2) has a melt flow rate $MFR_2$ (230° C., 2.16 kg) measured according to ISO 1133 in the range of 20 to 70 g/10 min.

In a preferred embodiment the polypropylene matrix (M2) is a propylene homopolymer (HPP2) having a melt flow rate $MFR_2$ (230° C., 2.16 kg) measured according to ISO 1133 in the range of 20 to 70 g/10 min.

Furthermore, also the properties of the elastomeric copolymer (E2) are important factors determining the properties of the polypropylene composition (C).

The heterophasic polypropylene (HECO2) may have a content of xylene cold soluble (XCS) fraction of not more than 50 wt.-%, preferably of not more than 40 wt.-%, more preferably of not more than 30 wt.-%; like in the range of 5 to 50 wt.-%, preferably in the range of 10 to 40 wt.-%, more preferably in the range of 20 to 30 wt.-%, based on the total weight of the heterophasic polypropylene (HECO2).

The heterophasic polypropylene (HECO2) may have an intrinsic viscosity (IV) of the xylene cold soluble (XCS) fraction of at least than 3.5 dl/g, preferably of at least 3.7 dl/g, more preferably of at least 3.9 dl/g; like in the range of 3.5 to 8.0 dl/g, preferably in the range of 3.7 to 7.5 dl/g, more preferably in the range of 3.9 to 7.0 dl/g.

The heterophasic polypropylene (HECO2) may have a comonomer content of the xylene cold soluble (XCS) fraction of not more than 45 mol %, preferably of not more than 35 mol %, more preferably of not more than 32 mol %; like in the range of 5 to 45 mol %, preferably in the range of 10 to 35 mol %, more preferably in the range of 15 to 32 mol %.

In an embodiment the heterophasic polypropylene (HECO2) has a content of xylene cold soluble (XCS) fraction in the range of 5 to 50 wt.-%, based on the total weight of the heterophasic polypropylene (HECO2), having an intrinsic viscosity in the range of 3.5 to 8.0 dl/g and a comonomer content in the range of 5 to 45 mol %.

In an embodiment the heterophasic polypropylene (HECO2) has a content of xylene cold soluble (XCS) fraction in the range of 10 to 40 wt.-%, based on the total weight of the heterophasic polypropylene (HECO2), having an intrinsic viscosity in the range of 3.7 to 7.5 dl/g and a comonomer content in the range of 10 to 35 mol %.

In an embodiment the heterophasic polypropylene (HECO2) has a content of xylene cold soluble (XCS) fraction in the range of 20 to 30 wt.-%, based on the total weight of the heterophasic polypropylene (HECO2), having an intrinsic viscosity in the range of 3.9 to 7.0 dl/g and a comonomer content in the range of 15 to 32 mol %.

In a preferred embodiment the polypropylene matrix (M2) is a propylene homopolymer (HPP2) having a melt flow rate $MFR_2$ (230° C., 2.16 kg) measured according to ISO 1133 in the range of 20 to 70 g/10 min and the elastomeric copolymer (E2) is a propylene ethylene copolymer having an intrinsic viscosity in the range of 3.7 to 7.5 dl/g and a comonomer content in the range of 10 to 35 mol %.

The heterophasic polypropylene copolymer (HECO2) may have a melt flow rate $MFR_2$ (230° C., 2.16 kg) measured according to ISO 1133 of not more than 30 g/10 min, preferably of not more than 20 g/10 min, more preferably of not more than 10 g/10 min; like in the range of 1 to 30 g/10 min, preferably in the range of 3 to 20 g/10 min, more preferably in the range of 5 to 10 g/10 min.

The heterophasic polypropylene copolymer (HECO2) may have a total comonomer content of not more than 40 mol %, preferably of not more than 30 mol %, even more preferably of not more than 20 mol %; like in the range of 1 to 40 mol %, preferably in the range of 5 to 30 mol %, more preferably in the range of 10 to 20 mol %.

In an embodiment the heterophasic polypropylene (HECO2) has a melt flow rate $MFR_2$ (230° C., 2.16 kg) measured according to ISO 1133 in the range of 1 to 30 g/10 min, a total comonomer content in the range of 1 to 40 mol %, a content of xylene cold soluble (XCS) fraction in the range of 5 to 50 wt.-%, based on the weight of the heterophasic polypropylene (HECO2), an intrinsic viscosity (IV) of the xylene cold soluble (XCS) fraction in the range of 3.5 to 8.0 dl/g, and a comonomer content of the xylene cold soluble (XCS) fraction in the range of 5 to 45 mol %.

In an embodiment the heterophasic polypropylene (HECO2) has a melt flow rate $MFR_2$ (230° C., 2.16 kg) measured according to ISO 1133 in the range of 3 to 20 g/10 min, a total comonomer content in the range of 5 to 30 mol %, a content of xylene cold soluble (XCS) fraction in the range of 10 to 40 wt.-%, based on the weight of the heterophasic polypropylene (HECO2), an intrinsic viscosity (IV) of the xylene cold soluble (XCS) fraction in the range of 3.7 to 7.5 dl/g, and a comonomer content of the xylene cold soluble (XCS) fraction in the range of 10 to 35 mol %.

In an embodiment the heterophasic polypropylene (HECO2) has a melt flow rate $MFR_2$ (230° C., 2.16 kg) measured according to ISO 1133 in the range of 10 to 20 g/10 min, a total comonomer content in the range of 5 to 10 mol %, a content of xylene cold soluble (XCS) fraction in the range of 20 to 30 wt.-%, based on the weight of the heterophasic polypropylene (HECO2), an intrinsic viscosity (IV) of the xylene cold soluble (XCS) fraction in the range of 3.9 to 7.0 dl/g, and a comonomer content of the xylene cold soluble (XCS) fraction in the range of 15 to 32 mol %.

Heterophasic Propylene Copolymer (HECO3)

The heterophasic polypropylene copolymer (HECO) may comprise the heterophasic polypropylene copolymer (HECO1) the heterophasic polypropylene copolymer (HECO2) and a third heterophasic polypropylene copolymer (HECO3).

The heterophasic polypropylene copolymer (HECO) may comprise the heterophasic polypropylene copolymer (HECO1), the heterophasic polypropylene copolymer (HECO2) and the heterophasic polypropylene copolymer (HECO3) as the only heterophasic propylene copolymers.

The heterophasic polypropylene copolymer (HECO) may not comprise any other heterophasic polypropylene copolymer besides the heterophasic polypropylene copolymer (HECO1), the heterophasic polypropylene copolymer (HECO2) and the heterophasic polypropylene copolymer (HECO3).

The heterophasic polypropylene copolymer (HECO) may consist of the heterophasic polypropylene copolymer (HECO1), the heterophasic polypropylene copolymer (HECO2) and the heterophasic polypropylene copolymer (HECO3), however, this does not exclude the presence of additives) as described in detail below.

If the heterophasic polypropylene copolymer (HECO) comprises the first heterophasic polypropylene copolymer (HECO1), the second heterophasic polypropylene copolymer (HECO2) and the third heterophasic polypropylene copolymer (HECO3) as the only heterophasic propylene copolymer compounds, it is appreciated, that the heterophasic propylene copolymer (HECO) comprises the heterophasic propylene copolymer (HECO3) in an amount of at least 40 parts per weight, preferably in an amount of at least 55 parts per weight, more preferably in an amount of at least 60 parts per weight; like in an amount in the range of 40 to 90 parts per weight, preferably in an amount in the range of 55 to 83 parts per weight, more preferably in an amount in the range of 60 to 75 parts per weight, based on the total parts per weight of the heterophasic polypropylene copolymer (HECO1), the heterophasic polypropylene copolymer (HECO2) and the heterophasic polypropylene copolymer (HECO3).

If the heterophasic polypropylene copolymer (HECO) comprises the heterophasic polypropylene copolymer (HECO1) the heterophasic polypropylene copolymer (HECO2) and the heterophasic polypropylene copolymer (HECO3) as the only heterophasic propylene copolymer compounds it is appreciated that the heterophasic propylene copolymer (HECO) comprises the heterophasic propylene copolymer (HECO1) in an amount of not more than 30 wt.-%, preferably in an amount of not more than 25 wt.-%, more preferably in an amount of not more than 23 wt-%; like in an amount in the range of 5 to 30 wt.-%, preferably in an amount in the range of 10 to 25 wt.-%, more preferably in an amount in the range of 15 to 23 wt.-%, based on the weight of the heterophasic propylene copolymer (HECO).

If the heterophasic polypropylene copolymer (HECO) comprises the heterophasic polypropylene copolymer (HECO1), the heterophasic polypropylene copolymer (HECO2) and the heterophasic polypropylene copolymer (HECO3) as the only heterophasic polypropylene copolymer compounds it is appreciated that the heterophasic polypropylene copolymer (HECO) comprises the heterophasic polypropylene copolymer (HECO2) in an amount of not more than 30 wt.-%, preferably in an amount of not more than 20 wt.-%, more preferably in an amount of not more than 17 wt.-%, like in an amount in the range of 5 to 30 wt.-%, preferably in an amount in the range of 7 to 20 wt.-%, more preferably in an amount in the range of 10 to 17 wt.-%, based on the weight of the heterophasic propylene copolymer (HECO).

If the heterophasic polypropylene copolymer (HECO) comprises the heterophasic polypropylene copolymer (HECO1), the heterophasic polypropylene copolymer (HECO2) and the heterophasic polypropylene copolymer (HECO3) as the only heterophasic propylene copolymer compounds it is appreciated that the heterophasic propylene copolymer (HECO) comprises the heterophasic propylene copolymer (HECO3) in an amount of at least 40 wt.-%, preferably in an amount of at least 55 wt.-%, more preferably in an amount of at least 60 wt.-%; like in an amount in the range of 40 to 90 wt.-%, preferably in an amount in the range of 55 to 83 wt.-%, more preferably in an amount in the range of 60 to 75 wt.-%, based on the weight of the heterophasic propylene copolymer (HECO).

In an embodiment the heterophasic polypropylene copolymer (HECO) comprises the first heterophasic polypropylene copolymer (HECO1), the second heterophasic polypropylene copolymer (HECO2) and the third heterophasic polypropylene copolymer (HECO3), wherein the heterophasic polypropylene copolymer (HECO1) is present in an amount of 5 to 30 wt.-%, the heterophasic polypropylene copolymer (HECO2) is present in an amount of 5 to 30 wt.-%, and the third heterophasic polypropylene copolymer (HECO3) is present in an amount of 40 to 90 wt.-%, based on the total weight of the heterophasic polypropylene copolymer (HECO).

In an embodiment the heterophasic polypropylene copolymer (HECO) comprises the first heterophasic polypropylene copolymer (HECO1), the second heterophasic polypropylene copolymer (HECO2) and the third heterophasic polypropylene copolymer (HECO3), wherein the first heterophasic polypropylene copolymer (HECO1) is present in an amount of 10 to 25 wt.-%, the second heterophasic polypropylene copolymer (HECO2) is present in an amount of 7 to 20 wt.-%, and the third heterophasic polypropylene copolymer (HECO3) is present in an amount of 55 to 83 wt.-%, based on the total weight of the heterophasic polypropylene copolymer (HECO).

In an embodiment the heterophasic polypropylene copolymer (HECO) comprises the first heterophasic polypropylene copolymer (HECO1), the second heterophasic polypropylene copolymer (HECO2) and the third heterophasic polypropylene copolymer (HECO3), wherein the first heterophasic polypropylene copolymer (HECO1) is present in an amount of 15 to 23 wt.-%, the second heterophasic polypropylene copolymer (HECO2) is present in an amount of 10 to 17 wt.-%, and the third heterophasic polypropylene copolymer (HECO3) is present in an amount of 60 to 75 wt.-%, based on the total weight of the heterophasic polypropylene copolymer (HECO).

As indicated above, it is appreciated that the heterophasic propylene copolymer (HECO3) comprises, preferably consists of (a) a polypropylene matrix (M3) and
(b) an elastomeric copolymer (E3) comprising units derivable from
propylene and
ethylene and/or $C_4$ to $C_{20}$ α-olefins, preferably from ethylene and/or $C_4$ to $C_{10}$ α-olefins, more preferably from ethylene only.

The polypropylene matrix (M3) may be a random propylene copolymer (RPP3) or a propylene homopolymer (HPP3), the latter being especially preferred.

In an embodiment the polypropylene matrix (M3) is a propylene homopolymer (HPP3).

In case the polypropylene matrix (M3) is a propylene homopolymer (HPP3), the comonomer content of the polypropylene matrix (M3) may be equal or below 1.0 wt.-%, preferably equal or below 0.8 wt.-%, more preferably equal or below 0.5 wt.-%, even more preferably equal or below 0.2 wt.-%, based on the weight of the polypropylene matrix (M3).

In case the polypropylene matrix (M3) is a random propylene copolymer (RPP3), it is appreciated that the random propylene copolymer (RPP3) comprises, preferably consists of, units derivable from propylene and units derivable from ethylene and/or $C_4$ to $C_{20}$ α-olefins, preferably units derivable from propylene and units derivable from ethylene and/or $C_4$ to $C_{10}$ α-olefins, more preferably units derivable from propylene and units derivable from ethylene and/or $C_4$, $C_6$ and/or $C_8$ α-olefins.

It is appreciated that the random propylene copolymer (RPP3) comprises, preferably consists of, units derivable from propylene and units derivable from ethylene, 1-butene and/or 1-hexene. More specifically, it is appreciated that the random propylene copolymer (RPP3) comprises—apart from propylene—only units derivable from ethylene, 1-butene and/or 1-hexene.

In an embodiment the random propylene copolymer (RPP3) consist of units derivable from propylene and units derivable from ethylene.

The second component of the heterophasic propylene copolymer (HECO3) is the elastomeric copolymer (E3).

The elastomeric copolymer (E3) may comprise units derivable from propylene and units derivable from ethylene and/or $C_4$ to $C_{20}$ α-olefins, preferably units derivable from propylene and units derivable from ethylene and/or $C_4$ to $C_{10}$ α-olefins, more preferably units derivable from propylene and units derivable from ethylene and/or $C_4$, $C_6$ and/or $C_8$ α-olefins.

The elastomeric copolymer (E3) may additionally comprise units derivable from a conjugated diene; like butadiene, or a non-conjugated diene. Suitable non-conjugated dienes, if used, include straight-chain and branched-chain acyclic dienes, such as 1,4-hexadiene, 1,5-hexadiene, 1,6-octadiene, 5-methyl-1,4-hexadiene, 3,7-dimethyl-1,6-octadiene, 3,7-dimethyl-1,7-octadiene, and the mixed isomers of dihydromyrcene and dihydroocimene, and single ring alicyclic dienes such as 1,4-cyclohexadiene, 1,5-cyclooctadiene, 1,5-cyclododecadiene, 4-vinyl cyclohexene, 1-allyl-4-isopropylidene cyclohexane, 3-allyl cyclopentene, 4-cyclohexene and 1-isopropenyl-4-(4-butenyl) cyclohexane. However, it is preferred that the elastomeric copolymer (E3) consists of units derivable from propylene and units derivable from ethylene and/or $C_4$ to $C_{20}$ α-olefins, preferably units derivable from propylene and units derivable from ethylene and/or $C_4$ to $C_{10}$ α-olefins, more preferably units derivable from propylene and units derivable from ethylene and/or $C_4$, $C_6$ and/or $C_8$ α-olefins.

In an embodiment the elastomeric copolymer (E3) consists of units derivable from propylene and ethylene.

The heterophasic propylene copolymer (HECO3) may comprise at least one α-nucleating agent. Furthermore, it is preferred that the heterophasic propylene copolymer (HECO3) does not comprise any β-nucleating agents.

Obviously, the disclosure on suitable and preferred α-nucleating agents provided above in conjunction with the heterophasic propylene copolymer (HECO) also applies to the α-nucleating agents which may be comprised in the heterophasic propylene copolymer (HECO3) and explicit reference is made to this passage.

The heterophasic propylene copolymer (HECO3), as well as its individual components (matrix phase and elastomeric phase), can be produced by blending different polymer types.

However, it is appreciated that the heterophasic propylene copolymer (HECO3) is produced in a sequential polymerization process, i.e. in a multistage process known in the art, wherein the polypropylene matrix (M3), is produced in at least in one slurry reactor and optionally in at least one gas phase reactor, and subsequently the elastomeric copolymer (E3) is produced in at least one gas phase reactor, preferably in two gas phase reactors. More precisely, the heterophasic propylene copolymer (HECO3) is obtained by producing a polypropylene matrix (M3) in at least one reactor system comprising at least one reactor, transferring the polypropylene matrix (M3) into a subsequent reactor system also comprising at least one reactor, wherein the elastomeric propylene copolymer (E3) is produced in presence of the polypropylene matrix (M3).

In an embodiment the heterophasic propylene copolymer (HECO3) is produced in a sequential polymerization process, wherein the polypropylene matrix (M3) is produced in a first reactor system comprising a slurry reactor (SL) and a first gas phase reactor (GPR1). Subsequently, the polypropylene matrix (M3) is transferred into a second reactor system comprising a second gas phase reactor (GPR2) and a third gas phase reactor (GPR3), wherein the elastomeric copolymer (E3) is produced in presence of the polypropylene matrix (M3).

A preferred multistage process is a "loop-gas phase"-process, such as developed by Borealis A/S, Denmark (known as BORSTAR® technology) described e.g. in patent literature, such as EP 0 887 379, WO 92/12182 WO 2004/000899, WO 2004/111095, WO 99/24478, WO 99/24479 and WO 00/68315. A further suitable slurry-gas phase process is the Spheripol® process of Basell.

The heterophasic propylene copolymer (HECO3) is prepared in the presence of a catalyst system. Suitable catalyst systems are known to the person skilled in the art and are selected according to needs, however, it is appreciated that a Ziegler-Natta catalyst system is applied. Suitable Ziegler-Natta catalyst system are for example described in WO2014/023603, EP591224, WO2012/007430, EP2610271, EP 261027 and EP2610272.

As indicated above, the heterophasic propylene copolymer (HECO3) comprises a polypropylene matrix (M3) and an elastomeric copolymer (E3) dispersed in the polypropylene matrix (M3).

It is appreciated that the heterophasic propylene copolymer (HECO3) comprises the polypropylene matrix (M3) in an amount in the range of 55 to 80 wt.-%, preferably in an amount in the range of 65 to 75 wt.-%, based on the weight of the heterophasic propylene copolymer (HECO3)

Furthermore, it is appreciated that the heterophasic propylene copolymer (HECO3) comprises the elastomeric copolymer (E3) in an amount in the range of 20 to 45 wt.-%, preferably in an amount in the range of 25 to 35 wt.-%, based on the weight of the heterophasic propylene copolymer (HECO3).

As indicated above the melt flow rate of the polypropylene matrix (M3) is an important factor determining the properties of the polypropylene composition (C). It is appreciated that the polypropylene matrix (M3) has a melt flow rate $MFR_2$ (230° C., 2.16 kg) measured according to ISO 1133 of at least 70 g/10 min, preferably at least 80, more preferably at least 90 g/10 min, even more preferably not more than 100 g/10 min; like in the range of 70 to 180 g/10 min, preferably in the range of 80 to 160 g/10 min, more preferably in the range of 90 to 150 g/10 min, even more preferably in the range of 100 to 125 g/10 min.

In an embodiment the polypropylene matrix (M3) is a propylene homopolymer (HPP3).

In an embodiment the polypropylene matrix (M3) has a melt flow rate MFR2 (230° C., 2.16 kg) measured according to ISO 1133 in the range of 90 to 150 g/10 min.

In a preferred embodiment the polypropylene matrix (M3) is a propylene homopolymer (HPP3) having a melt flow rate MFR2 (230° C., 2.16 kg) measured according to ISO 1133 in the range of 90 to 150 g/10 min.

The heterophasic polypropylene copolymer (HECO3) may have may have a total comonomer content of not more than 40 mol %, preferably of not more than 30 mol %, even more preferably of not more than 25 mol %; like in the range of 5 to 40 mol %, preferably in the range of 10 to 30 mol %, more preferably in the range of 15 to 25 mol %.

The heterophasic polypropylene (HECO3) may have a content of xylene cold soluble (XCS) fraction of not more than 55 wt.-%, preferably of not more than 45 wt.-%, more preferably of not more than 40 wt.-%; like in the range of 10 to 55 wt.-%, preferably in the range of 20 to 45 wt.-%, more preferably in the range of 25 to 40 wt.-%, based on the weight of the heterophasic polypropylene (HECO3).

The heterophasic polypropylene (HECO3) may have an intrinsic viscosity (IV) of the xylene cold soluble (XCS) fraction of not more than 3.5 dl/g, preferably of not more than 3.4 dl/g, more preferably of not more than 3.3 dl/g, even more preferably of not more than 3.2 dl/g; like in the range of 2.0 to 3.5 dl/g, preferably in the range of 2.5 to 3.4 dl/g, more preferably in the range of 2.5 to 3.3 dl/g, even more preferably in the range of 2.9 to 3.2 dl/g.

The heterophasic polypropylene (HECO3) may have a comonomer content of the xylene cold soluble (XCS) fraction of not more than 65 mol %, preferably of not more than 60 mol %, more preferably of not more than 50 mol %; like in the range of 30 to 65 mol %, preferably in the range of 35 to 60 wt.-%, more preferably in the range of 45 to 55 mol %.

In an embodiment the heterophasic polypropylene (HECO3) has a melt flow rate $MFR_2$ (230° C., 2.16 kg) measured according to ISO 1133 in the range of 6 to 50 g/10 min, a total comonomer content in the range of 5 to 40 mol %, a content of xylene cold soluble (XCS) fraction in the range of 10 to 55 wt.-%, based on the weight of the heterophasic polypropylene (HECO3), an intrinsic viscosity (IV) of the xylene cold soluble (XCS) fraction in the range of 2.0 to 3.5 dl/g, and a comonomer content of the xylene cold soluble (XCS) fraction in the range of 30 to 65 mol %.

In an embodiment the heterophasic polypropylene (HECO3) has a melt flow rate $MFR_2$ (230° C., 2.16 kg) measured according to ISO 1133 in the range of 16 to 40 g/10 min, a total comonomer content in the range of 10 to 30 mol %, a content of xylene cold soluble (XCS) fraction in the range of 25 to 45 wt.-%, based on the weight of the heterophasic polypropylene (HECO3), an intrinsic viscosity (IV) of the xylene cold soluble (XCS) fraction in the range of 2.5 to 3.4 dl/g, and a comonomer content of the xylene cold soluble (XCS) fraction in the range of 35 to 60 mol %.

In an embodiment the heterophasic polypropylene (HECO3) has a melt flow rate $MFR_2$ (230° C., 2.16 kg) measured according to ISO 1133 in the range of 21 to 30 g/10 min, a total comonomer content in the range of 15 to 25 mol %, a content of xylene cold soluble (XCS) fraction in the range of 20 to 45 wt.-%, based on the weight of the heterophasic polypropylene (HECO3), an intrinsic viscosity (IV) of the xylene cold soluble (XCS) fraction in the range of 2.9 to 3.2 dl/g, and a comonomer content of the xylene cold soluble (XCS) fraction in the range of 35 to 60 mol %.

Plastomer (PL)

The plastomer (PL) can be any elastomeric polyolefin with the proviso that it chemically differs from the elastomeric propylene copolymer (E) of the heterophasic propylene copolymer (HECO), as well as the elastomeric propylene copolymer (E1) of the heterophasic propylene copolymer (HECO1), the elastomeric propylene copolymer (E2) of the heterophasic propylene copolymer (HECO2) and the elastomeric propylene copolymer (E3) of the heterophasic propylene copolymer (HECO3) described above.

It is appreciated that the plastomer (PL) is a low density polyolefin, in particular a low density polyolefin polymerized using single site catalyst.

The plastomer (PL) may be an elastomeric ethylene copolymer (EC) comprising, preferably consisting of, units derivable from ethylene and at least another $C_4$ to $C_{20}$ α-olefin.

It is appreciated that the plastomer (PL) is an elastomeric ethylene copolymer (EC) comprising, preferably consisting of, units derivable from ethylene and at least another $C_4$ to $C_{10}$ α-olefin.

In particular, it is appreciated that the plastomer (PL) is an elastomeric ethylene copolymer (EC) comprising, preferably consisting of, units derivable from ethylene and at least another α-olefin selected form the group consisting of 1-butene, 1-pentene, 1-hexene, 1-heptene and 1-octene, more preferably an elastomeric ethylene copolymer (EC) comprising, preferably consisting of, units derivable from ethylene and at least another α-olefin selected form the group consisting of 1-butene and 1-octene, even more preferably an elastomeric ethylene copolymer (EC) comprising, preferably consisting of, units derivable from ethylene and 1-octene.

In an embodiment the plastomer (PL) is an elastomeric ethylene copolymer (EC) comprising, preferably consisting of, units derivable from ethylene and at least another α-olefin selected form the group consisting of 1-butene, 1-pentene, 1-hexene and 1-octene.

In a preferred embodiment the plastomer (PL) is an elastomeric ethylene copolymer (EC) consisting of units derivable from ethylene and 1-octene.

It is appreciated that the plastomer (PL) has a melt flow rate $MFR_2$ (190° C., 2.16 kg) measured according to ISO 1133 of not more than 10.0 g/10 min, preferably of not more than 5.0 g/10 min, more preferably of not more than 3.0 g/10 min, like in the range of 0.1 to 10.0 g/10 min, preferably in the range of 0.3 to 5.0 g/10 min, more preferably in the range of 0.5 to 3.0 g/10 min, even more preferably in the range of 0.5 to 1.5 g/10 min.

It is appreciated that the plastomer (PL) has a density measured according to ISO 1183-187 of not more than 900 kg/m$^3$, preferably of not more than 890 kg/m$^3$, more preferably of not more than 885 kg/m$^3$; like in the range of 850 to 900 kg/m$^3$, preferably in the range of 860 to 890 kg/m$^3$, more preferably in the range of 865 to 885 kg/m$^3$.

It is appreciated that the plastomer (PL) has no glass transition temperature below −60° C., preferably below −55° C. On the other hand, it is appreciated that the plastomer (PL) has a glass transition temperature in the range of −60 to −40° C., preferably in the range of −55 to −45° C.

In case the plastomer (PL) is an elastomeric ethylene copolymer (EC) consisting of units derivable from ethylene and 1-octene it is appreciated that the ethylene content of the elastomeric ethylene copolymer (EC) is at least 70 mol %, preferably at least 80 mol %; like in the range of 70 to 99 mol %, preferably in the range of 80 to 95 mol %.

The plastomer (PL) is known in the art and commercially available. A suitable examples are Engage® 8100 of The Dow Chemical Company or Queo® 8201 of Borealis.

Filler (F)

As indicated above, it is a finding of the present invention that the paint adhesion of a polypropylene composition can be improved while maintaining sufficient stiffness and impact behavior when providing a specific heterophasic propylene copolymer in combination with a specific inorganic filler. Thus, the polypropylene composition (C) necessarily comprises the inorganic filler (F).

The inorganic filler (F) is not regarded as being encompassed by the term "additive" as defined in more detail below.

It is appreciated that the inorganic filler (F) is a mineral filler, in particular a mineral filler selected from the group consisting of mica, wollastonite, kaolinite, montmorillonite, talc and mixtures thereof, preferably is a mineral filler selected from the group consisting of mica, wollastonite, talc and mixtures thereof, even more preferably is mica and/or talc.

In an embodiment the inorganic filler (F) a mineral filler selected from the group consisting of mica, talc and mixtures thereof.

In an embodiment the inorganic filler (F) is mica.

In an embodiment the inorganic filler (F) is talc.

In particular it is a finding of the present invention that the paint adhesion of a polypropylene composition can be improved while maintaining sufficient stiffness and impact behavior when providing a specific heterophasic propylene copolymer in combination with an inorganic filler having relatively large sized particles.

It is appreciated that the inorganic filler (F) has a median particle size ($D_{50}$) of at least 1.5 µm, preferably of at least 2.0 µm, more preferably of at least 3.0 µm; like in the range of 1.5 to 8.0 µm, preferably in the range of 2.0 to 7.0 µm, more preferably in the range of 3.0 to 6.0 µm.

The inorganic filler (F) may be talc having a median particle size $D_{50}$ of at least 1.5 µm, preferably of at least 2.0 µm, more preferably of at least 3.0 µm, like in the range of 1.5 to 6.0 µm, preferably in the range of 2.0 to 5.0 µm, more preferably in the range of 3.0 to 4.5 µm.

The inorganic filler (F) may be mica having a median particle size $D_{50}$ of at least 3.0 preferably of at least 4.0 µm, more preferably of at least 4.6 µm, like in the range of 3.0 to 8.0 µm, preferably in the range of 4.0 to 7.0 µm, more preferably in the range of 4.6 to 6.0 µm.

The inorganic filler (F) may be talc having a cut-off particle size $D_{95}$ of at least 4.0 µm, preferably of at least 6.0 µm, more preferably of at least 8.0 µm, like in the range of 4.0 to 20.0 µm, preferably in the range of 6.0 to 15.0 µm, more preferably in the range of 8.0 to 10.0 µm.

The inorganic filler (F) may be mica having a cut-off particle size $D_{98}$ of at least 15.0 µm, preferably of at least 20.0 µm, more preferably of at least 25.0 µm, like in the range of 15.0 to 45.0 µm, preferably in the range of 20.0 to 40.0 µm, more preferably in the range of 25.0 to 35.0 µm.

In an embodiment the inorganic filler (F) is a mineral filler selected from the group consisting of mica, talc and mixtures thereof, having a median particle size ($D_{50}$) in the range of 1.5 to 8.0 µm.

In an embodiment the inorganic filler (F) is a mineral filler selected from the group consisting of mica, talc and mixtures thereof, having a median particle size ($D_{50}$) in the range of 2.0 to 7.0 µm.

In an embodiment the inorganic filler (F) is a mineral filler selected from the group consisting of mica, talc and mixtures thereof, having a median particle size ($D_{50}$) in the range of 3.0 to 6.0 µm.

In an embodiment the inorganic filler (F) is talc having a median particle size ($D_{50}$) in the range of 1.5 to 6.0 µm and a cut off particle size ($D_{95}$) in the range of 4.0 to 20.0 µm.

In an embodiment the inorganic filler (F) is talc having a median particle size ($D_{50}$) in the range of 2.0 to 5.0 µm and a cut off particle size ($D_{95}$) in the range of 6.0 to 15.0 µm.

In an embodiment the inorganic filler (F) is talc having a median particle size ($D_{50}$) in the range of 3.0 to 4.5 µm and a cut off particle size ($D_{95}$) in the range of 8.0 to 10.0 µm.

In an embodiment the inorganic filler (F) is mica having a median particle size ($D_{50}$) in the range of 3.0 to 8.0 µm and a cut off particle size ($D_{98}$) in the range of 15.0 to 45.0 µm.

In an embodiment the inorganic filler (F) is mica having a median particle size ($D_{50}$) in the range of 4.0 to 7.0 µm and a cut off particle size ($D_{98}$) in the range of 20.0 to 40.0 µm.

In an embodiment the inorganic filler (F) is mica having a median particle size ($D_{50}$) in the range of 4.6 to 6.0 µm and a cut off particle size ($D_{98}$) in the range of 25.0 to 35.0 µm.

The inorganic filler (F) is known in the art and commercially available. Suitable examples are MicaFort® PW80 of LKAB Minerals AB and Luzenac®A20 of Imerys LLC.

Additives (AD)

In addition to the heterophasic propylene copolymer (HECO), the plastomer (PL) and the inorganic filler (F) the polypropylene composition (C) may comprise additives (AD).

Typical additives are acid scavengers, antioxidants, colorants, light stabilisers, plasticizers, slip agents, anti-scratch agents, dispersing agents, processing aids, lubricants, pigments, antistatic agent, and the like.

Such additives are commercially available and, for example, described in "Plastic Additives Handbook", $6^{th}$ edition 2009 of Hans Zweifel (pages 1141 to 1190).

As indicated, above the term "additives (AD)" does not include the inorganic filler (F), in particular the mineral filler (F) selected from the group consisting of mica, wollastonite, kaolinite, montmorillonite, talc and mixtures thereof. In other words, the inorganic filler (F), in particular the mineral filler (F) selected from the group consisting of mica, wollastonite, kaolinite, montmorillonite, talc and mixtures thereof, is not regarded as an additive.

However, the term "additives (AD)" may also include carrier materials, in particular polymeric carrier materials (PCM).

The polypropylene composition (C) may comprise the additives (AD) in an amount of not more than 10.0 wt.-%, preferably in an amount of not more than 5.0 wt.-%, more preferably in an amount of not more than 3.0 wt.-%, even more preferably in an amount of not more than 2.0 wt.-%; like in an amount in the range of 0.1 to 10.0 wt.-%, preferably in an amount in the range of 0.1 to 5.0 wt.-%, more preferably in an amount in the range of 0.1 to 3.0 wt.-%, even more preferably in an amount in the range of 0.1 to 2.0 wt.-%, based on the weight of the polypropylene composition (C).

The polypropylene composition (C) may comprise additives selected from the group consisting of antioxidants, acid scavengers, anti-scratch agents, mould-release agents, lubricants, UV-stabilisers and mixtures thereof.

The additives (AD) may be included into the polypropylene composition (C) as a separate ingredient. Alternatively, the additives (AD) may be included into the polypropylene composition (C) together with at least one other component. For example, the additives may be added to the polymer composition (C) together the heterophasic propylene copolymer (HECO), the plastomer (PL) and/or the inorganic filler (F), preferably in form of a master batch (MB). Hence, the terms "heterophasic propylene copolymer (HECO)", "plastomer (PL)" and "inorganic filler (F)" may be directed at a composition including additives (AD).

Additives (other than the polymeric carrier materials (PCM)) are typically added to the polypropylene composition (C) together with carrier material, such as a polymeric carrier material (PCM), in form of a master batch (MB).

Thus, a polypropylene composition (C) consisting of a heterophasic propylene copolymer (HECO), a plastomer (PL) and inorganic filler (F) may additionally comprise additives (AD).

Polymeric Carrier Material (PCM)

As indicated above, the polypropylene composition (C) may not comprise other polymers besides the heterophasic propylene copolymer (HECO) and the plastomer (PL) in an amount exceeding 10 wt.-%, preferably in an amount exceeding 5 wt.-%, more preferably in an amount exceeding 2.5 wt.-%, even more preferably in an amount exceeding 0.8 wt.-%, based on the weight of the polypropylene composition (C).

In an embodiment the polypropylene composition (C) does not comprise other polymers besides the heterophasic propylene copolymer (HECO) and the plastomer (PL) in an amount exceeding 0.8 wt.-%, based on the weight of the polypropylene composition (C).

If an additional polymer is present, such a polymer is typically a polymeric carrier material (PCM).

The polymeric carrier material (PCM) is a carrier polymer for the other additives to ensure a uniform distribution in the polypropylene composition (C). The polymeric carrier material (PCM) is not limited to a particular polymer. The polymeric carrier material (PCM) may be an ethylene homopolymer, an ethylene copolymer, like an ethylene copolymer comprising units derivable from ethylene and units derivable from $C_3$ to $C_8$ α-olefins, a propylene homopolymer, a propylene copolymer, like a propylene copolymer comprising units derivable from propylene and units derivable from ethylene and/or $C_4$ to $C_8$ α-olefins and mixtures thereof.

Typically the polymeric carrier material (PCM) as such does not contribute to the improved properties of the polypropylene composition (C).

It is appreciated that the polymeric carrier material (PCM) is present in the polypropylene composition (C) in an amount of not more than 10 wt.-%, preferably in an amount of not more than 5 wt.-%, more preferably in an amount of not more than 2.5 wt.-%, even more preferably in an amount of not more than 0.8 wt.-%, based on the weight of the polypropylene composition (C).

In an embodiment the polymeric carrier material (PCM) is present in the polypropylene composition (C) in an amount of not more than 5 wt-%, based on the weight of the polypropylene composition (C).

In a preferred embodiment the polymeric carrier material (PCM) is present in the polypropylene composition (C) in an amount of not more than 0.8 wt.-%, based on the weight of the polypropylene composition (C).

Article

The present invention is further directed at an article comprising the polypropylene composition (C).

The article may comprise the polypropylene composition (C) in an amount of at least 80 wt.-%, preferably in an amount of at least 90 wt.-%, more preferably in an amount of at least 95 wt.-%; like an amount in the range of 80 to 99.9 wt.-%, preferably in the range of 90 to 99.9 wt.-%, more preferably in the range of 95 to 99.9 wt.-%, based on the weight of the polypropylene composition (C).

The article may be a molded article or an extruded article, preferably the article is a molded article; like an injection molded article or a compression molded article.

EXAMPLES

1. Definitions/Measuring Methods

The following definitions of terms and determination methods apply for the above general description of the invention as well as to the below examples unless otherwise defined.

Quantification of Microstructure by NMR Spectroscopy

Quantitative nuclear-magnetic resonance (NMR) spectroscopy is used to quantify the isotacticity and regio-regularity of the polypropylene homopolymers.

Quantitative $^{13}C\{^1H\}$ R spectra were recorded in the solution-state using a Bruker Advance III 400 R spectrometer operating at 400.15 and 100.62 MHz for $^1H$ and $^{13}C$ respectively. All spectra were recorded using a $^{13}C$ optimised 10 mm extended temperature probe head at 125° C. using nitrogen gas for all pneumatics.

For polypropylene homopolymers approximately 200 mg of material was dissolved in 1,2-tetrachloroethane-$d_2$ (TCE-$d_2$). To ensure a homogenous solution, after initial sample preparation in a heat block, the R tube was further heated in a rotatory oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromolecules 30 (1997) 6251). Standard single-pulse excitation was employed utilising the NOB and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8 k) transients were acquired per spectra.

Quantitative $^{13}C\{^1H\}$ NMR spectra were processed, integrated and relevant quantitative properties determined from the integrals using proprietary computer programs.

For polypropylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci, 26 (2001) 443; Busico, V., Cipullo, R., Monaco, G., Vacatello, M., Segre, A. L., Macromolecules 30 (1997) 6251).

Specifically the influence of regio-defects and comonomer on the quantification of the tacticity distribution was corrected for by subtraction of representative regio-defect and comonomer integrals from the specific integral regions of the stereo sequences. The isotacticity was determined at the pentad level and reported as the percentage of isotactic pentad (mmmm) sequences with respect to all pentad sequences:

$$[\text{mmmm}]\% = 100*(\text{mmmm/sum of all pentads})$$

The presence of 2,1 erythro regio-defects was indicated by the presence of the two methyl sites at 17.7 and 17.2 ppm and confirmed by other characteristic sites. Characteristic signals corresponding to other types of regio-defects were not observed (Resconi, L., Cavallo, L., Fait, A., Piemontesi, F., Chem. Rev. 2000, 100, 1253).

The amount of 2,1 erythro regio-defects was quantified using the average integral of the two characteristic methyl sites at 17.7 and 17.2 ppm:

$$P_{21e} = (I_{e6} + I_{e8})/2$$

The amount of 1,2 primary inserted propene was quantified based on the methyl region with correction undertaken for sites included in this region not related to primary insertion and for primary insertion sites excluded from this region:

$$P_{12} = I_{CH3} + P_{12e}$$

The total amount of propene was quantified as the sum of primary inserted propene and all other present regio-defects:

$P_{total} = P_{12} + P_{21e}$

The mole percent of 2,1-erythro regio-defects was quantified with respect to all propene:

$[21e] \text{ mol.-\%} = 100 * (P_{21e}/P_{total})$

Characteristic signals corresponding to the incorporation of ethylene were observed (as described in Cheng, H. N., Macromolecules 1984, 17, 1950) and the comonomer fraction calculated as the fraction of ethylene in the polymer with respect to all monomer in the polymer.

The comonomer fraction was quantified using the method of W-J. Wang and S. Zhu, Macromolecules 2000, 33 1157, through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents.

The mole percent comonomer incorporation was calculated from the mole fraction.

The weight percent comonomer incorporation was calculated from the mole fraction.

Melt Flow Rate MFR$_2$ (230° C.) was measured at 230° C. under a load of 2.16 kg according to ISO 1133.

Melt Flow Rate MFR2 (190° C.) was measured at 190° C. under a load of 2.16 kg according to ASTM D1238.

Xylene Cold Soluble (XCS) Fraction was measured at 25° C. according ISO 16152; first edition; 2005-07-01.

Intrinsic Viscosity as measured according to DIN ISO 1628/1, October 1999 (in Decalin at 135° C.).

Tensile Modulus; Tensile Stress at Break were measured according to ISO 527-2 (cross head speed=1 mm/min; 23° C.) using injection molded specimens as described in EN ISO 1873-2 (dog bone shape, 4 mm thickness)

Tensile Elongation at Break; Tensile Strength at Yield were measured according to ISO 527-2 (cross head speed=50 mm/min; 23° C.) using injection molded specimens as described in EN ISO 1873-2 (dog bone shape, 4 mm thickness).

Charpy Notched Impact Strength at +23° C. (NIS+23) was measured according to ISO 179-1eA:2000, using injection molded bar test specimens of 80×10×4 mm$^3$ prepared in accordance with EN ISO 1873-2.

Charpy Notched Impact Strength at −20° C. (NIS-20) was measured according to ISO 179-1eA:2000, using injection molded bar test specimens of 80×10×4 mm$^3$ prepared in accordance with EN ISO 1873-2.

Cut-Off Particle Size D$_{95}$ (Sedimentation) was calculated from the particle size distribution [wt. %] as determined by gravitational liquid sedimentation according to ISO 13317-3 (Sedigraph).

Cut-Off Particle Size D$_{98}$ (Sedimentation) was calculated from the particle size distribution [wt. %] as determined by gravitational liquid sedimentation according to ISO 13317-3 (Sedigraph).

Median Particle Size D$_{50}$ (Sedimentation) was calculated from the particle size distribution [wt.-%] as determined by gravitational liquid sedimentation according to ISO 13317-3 (Sedigraph).

BET Surface Area was measured according to DIN 66131/2 with nitrogen (N$_2$).

Adhesion is characterized as the resistance of the prefabricated scratch template to pressure-water jetting according to DIN 55662 (Method C).

Injection moulded sample plates (150 mm×80 mm×2 mm) were cleaned with Zeller Gmelin Divinol® 1262. Subsequently the surface was activated via flaming where a burner with a speed of 670 mm/s spreads a mixture of propane (9 l/min) and air (180 l/min) in a ratio of 1:20 on the polymer substrate. Afterwards, the polymer substrate was coated with 2 layers, i.e. a base coat (Iridium Silver Metallic 117367) and a clear coat (Carbon Creations® 107062). The step of flaming was performed two times.

A steam of hot water with temperature T was directed for time t at distance d under angle α to the surface of the test panel. Pressure of the water jet results from the water flow rate and is determined by the type of nozzle installed at the end of the water pipe.

The following parameters were used:

T(water)=60° C.; t=60 s; d=100 mm, α=90°, water flow rate 11.3 l/min, nozzle type=MPEG 2506.

The adhesion was assessed by quantifying the failed or delaminated painted area per test line. For each example 5 panels (150 mm×80 mm×2 mm) have been tested. The panels were produced by injection moulding with 240° C. melt temperature and 50° C. mold temperature. The flow front velocity was 100 mm/s and 400 mm/s respectively. On each panel certain lines were used to assess the paintability failure in [mm$^2$]. For this purpose, an image of the test point before and after steam jet exposure was taken. Then the delaminated area was calculated with an image processing software. The average failed area for 5 test lines on 5 test specimens (i.e. in total the average of 25 test points) was reported as median failed area.

SD is the standard deviation which is determined according to the following formula:

$$\text{Sample Standard Deviation} = \sqrt{\frac{\Sigma(x - \bar{x})^2}{(n-1)}}$$

wherein x are the observed values;

$\bar{x}$ is the mean of the observed values; and n is the number of observations.

Preparation of the Heterophasic Propylene Copolymer (HECO1)

Catalyst Preparation:

First, 0.1 mol of MgCl$_2$×3 EtOH was suspended under inert conditions in 250 ml of decane in a reactor at atmospheric pressure. The solution was cooled to −15° C. and 300 ml of cold TiCl$_4$ were added, while maintaining the temperature at said level. Then, the temperature of the slurry was increased slowly to +20° C. At this temperature, 0.02 mol of dioctylphthalate (DOP) was added to the slurry. After the addition of the phthalate, the temperature was raised to +135° C. within 90 minutes and the slurry was allowed to stand for 60 minutes. Then, additional 300 ml of TiCl$_4$ were added and the temperature was kept at +135° C. for 120 minutes. Subsequently, the catalyst was filtered from the liquid and washed six times with 300 ml heptane at 80° C. The solid catalyst component was filtered and dried.

The catalyst and its general concept of preparation is described e.g. in WO 87/07620, WO 92/19653, WO 92/19658 and EP 0 491 566, EP 591224 and EP 586390.

VCH Modification:

The catalyst was further modified. 35 ml of mineral oil (Paraffinum Liquidum PL68) were added to a 125 ml stainless steel reactor followed by 0.82 g of triethyl aluminium (TEAL) and 0.33 g of dicyclopentyl dimethoxy silane (donor D) under inert conditions at room temperature. After 10 minutes 5.0 g of the catalyst described above (Ti content 1.4 wt.-%) was added. After 20 minutes 5.0 g of vinylcyclohexane (VCH) were added. The temperature was increased to +60° C. within 30 minutes and was kept for 20 hours. Finally, the temperature was decreased to +20° C. and the concentration of unreacted VCH in the oil/catalyst mixture was analysed and was found to be 200 ppm weight. As external donor di(cyclopentyl) dimethoxy silane (donor D) was used.

Polymer Preparation:

The heterophasic propylene copolymer (HECO1) is prepared in a slurry reactor (SL) and multiple gas phase reactors connected in series (1$^{st}$ GPR, 2$^{nd}$ GPR and 3$^{rd}$ GPR). The conditions applied and the properties of the products obtained are summarized in Table 1.

TABLE 1

Preparation of the heterophasic propylene copolymer (HECO1)

|  |  | HECO1 |
|---|---|---|
| Prepolymerization |  |  |
| TEAL/Ti | [mol/mol] | 220 |
| TEAL/Do | [mol/mol] | 7.3 |
| Temperature | [° C.] | 30 |
| Residence time | [h] | 0.08 |
| Loop |  |  |
| Temperature | [° C.] | 72 |
| Split | [%] | 25 |
| H2/C3 | [mol/kmol] | 15 |
| C2/C3 | [mol/kmol] | 0 |
| MFR$_2$ | [g/10 min] | 55 |
| XCS | [wt.-%] | 2.0 |
| C2 | [mol-%] | 0 |
| 1$^{st}$ GPR |  |  |
| Temperature | [° C.] | 80 |
| Pressure | [kPa] | 2231 |
| Split | [%] | 40 |
| H2/C3 | [mol/kmol] | 150 |
| C2/C3 | [mol/kmol] | 0 |
| MFR$_2$ | [g/10 min] | 55 |
| XCS | [wt.-%] | 2.0 |
| C2 | [mol-%] | 0 |
| 2$^{nd}$ GPR |  |  |
| Temperature | [° C.] | 70 |
| Pressure | [kPa] | 2291 |
| Split | [%] | 20 |
| C2/C3 | [mol/kmol] | 584 |
| H2/C2 | [mol/kmol] | 117 |
| MFR$_2$ | [g/10 min] | 20 |
| XCS | [wt.-%] | 20 |
| IV (XCS) | [dl/g] | nd |
| C2 (XCS) | [mol-%] | nd |
| C2 | [mol-%] | 18 |
| 3rd GPR |  |  |
| Temperature | [° C.] | 85 |
| Pressure | [kPa] | 142 |
| Split | [%] | 15 |
| C2/C3 | [mol/kmol] | 585 |
| H2/C2 | [mol/kmol] | 93 |
| MFR$_2$ | [g/10 min] | 11 |
| XCS | [wt.-%] | 30 |
| IV (XCS) | [dl/g] | 3.5 |

TABLE 1-continued

Preparation of the heterophasic propylene copolymer (HECO1)

|  |  | HECO1 |
|---|---|---|
| C2 (XCS) | [mol-%] | 50 |
| C2 | [mol-%] | 19 |

C2 ethylene content
H2/C3 hydrogen/propylene ratio
C2/C3 ethylene/propylene ratio
H2/C2 hydrogen/ethylene ratio
1$^{st}$ 2$^{nd}$ 3$^{rd}$ GPR 1$^{st}$ 2$^{nd}$ 3$^{rd}$ gas phase reactor
Loop loop reactor
TEAL/Ti TEAL/Ti ratio
TEAL/Do TEAL/Donor ratio
MFR$_2$ melt flow rate
XCS xylene cold soluble fraction
C2 (XCS) ethylene content of the xylene cold soluble fraction
IV (XCS) intrinsic viscosity of the xylene cold soluble fraction
nd not determined The properties of the products obtained from the individual reactors naturally are not determined from homogenized material but from reactor samples (spot samples). The properties of the final resin are measured on homogenized material.

Preparation of the Heterophasic Propylene Copolymer (HECO2)

Catalyst Preparation:

The catalyst applied for the preparation of the heterophasic propylene copolymer (HECO2) is the same catalyst as the catalyst applied for the preparation of the heterophasic propylene copolymer (HECO1).

Polymer Preparation:

The heterophasic propylene copolymer (HECO2) is prepared in a slurry and multiple gas phase reactors connected in series. The conditions applied and the properties of the products obtained are summarized in Table 2.

TABLE 2

Preparation of the heterophasic propylene copolymer (HECO2)

|  |  | HECO2 |
|---|---|---|
| Loop |  |  |
| Temperature | [° C.] | 76 |
| Split | [%] | 5 |
| H2/C3 | [mol/kmol] | 25 |
| C2/C3 | [mol/kmol] | 0 |
| MFR$_2$ | [g/10 min] | 160 |
| XCS | [wt.-%] | nd |
| C2 | [mol-%] | 0 |
| 1$^{st}$ GPR |  |  |
| Temperature | [° C.] | 80 |
| Pressure | [kPa] | 2400 |
| Split | [%] | 40 |
| H2/C3 | [mol/kmol] | 45 |
| C2/C3 | [mol/kmol] | 0 |
| MFR$_2$ | [g/10 min] | 55 |
| XCS | [wt.-%] | nd |
| C2 | [mol-%] | 0 |
| 2$^{nd}$ GPR |  |  |
| Temperature | [° C.] | 67 |
| Pressure | [kPa] | 2100 |
| Split | [%] | 15 |
| C2/C3 | [mol/kmol] | 242 |
| H2/C2 | [mol/kmol] | 23 |
| MFR$_2$ | [g/10 min] | 20 |
| XCS | [wt.-%] | 20 |
| IV (XCS) | [dl/g] | >4.0 |

TABLE 2-continued

Preparation of the heterophasic propylene copolymer (HECO2)

|  |  | HECO2 |
|---|---|---|
| C2 (XCS) | [mol-%] | 28 |
| C2 | [mol-%] | 10 |
| 3rd GPR |  |  |
| Temperature | [° C.] | 67 |
| Pressure | [kPa] | 1500 |
| Split | [%] | 10 |
| C2/C3 | [mol/kmol] | 250 |
| H2/C2 | [mol/kmol] | 22 |
| MFR$_2$ | [g/10 min] | 7 |
| XCS | [wt.-%] | 27 |
| IV (XCS) | [dl/g] | 6.3 |
| C2 (XCS) | [mol-%] | 28 |
| C2 | [mol-%] | 12 |

C2 ethylene content
H2/C3 hydrogen/propylene ratio
C2/C3 ethylene/propylene ratio
H2/C2 hydrogen/ethylene ratio
1$^{st}$ 2$^{nd}$ 3$^{rd}$ GPR 1$^{st}$ 2$^{nd}$ 3$^{rd}$ gas phase reactor
Loop loop reactor
TEAL/Ti TEAL/Ti ratio
TEAL/Do TEAL/Donor ratio
MFR$_2$ melt flow rate
XCS xylene cold soluble fraction
C2 (XCS) ethylene content of the xylene cold soluble fraction
IV (XCS) intrinsic viscosity of the xylene cold soluble fraction
nd not determined Preparation of the Heterophasic Propylene Copolymer (HECO3)

Catalyst Preparation:

The catalyst applied for the preparation of the heterophasic propylene copolymer (HECO3) is the same catalyst as the catalyst applied for the preparation of the heterophasic propylene copolymer (HECO1).

Polymer Preparation:

The heterophasic propylene copolymer (HECO3) is prepared in a slurry and multiple gas phase reactors connected in series. The conditions applied and the properties of the products obtained are summarized in Table 3.

TABLE 3

Preparation of the heterophasic propylene copolymer (HECO3)

|  |  | HECO3 |
|---|---|---|
| Loop |  |  |
| Temperature | [° C.] | 72 |
| Split | [%] | 29 |
| H2/C3 | [mol/kmol] | 21 |
| C2/C3 | [mol/kmol] | 0 |
| MFR$_2$ | [g/10 min] | 115 |
| XCS | [wt.-%] | nd |
| C2 | [mol-%] | 0 |
| 1$^{st}$ GPR |  |  |
| Temperature | [° C.] | 85 |
| Pressure | [kPa] | 2500 |
| Split | [%] | 36 |
| H2/C3 | [mol/kmol] | 204 |
| C2/C3 | [mol/kmol] | 0 |
| MFR$_2$ | [g/10 min] | 115 |
| XCS | [wt.-%] | nd |
| C2 | [mol-%] | 0 |
| 2$^{nd}$ GPR |  |  |
| Temperature | [° C.] | 75 |
| Pressure | [kPa] | 2000 |
| Split | [%] | 22 |
| C2/C3 | [mol/kmol] | 701 |

TABLE 3-continued

Preparation of the heterophasic propylene copolymer (HECO3)

|  |  | HECO3 |
|---|---|---|
| H2/C2 | [mol/kmol] | 85 |
| MFR$_2$ | [g/10 min] | 40 |
| XCS | [wt.-%] | 20 |
| IV (XCS) | [dl/g] | 3.1 |
| C2 (XCS) | [mol-%] | 50 |
| C2 | [mol-%] | 12 |
| 3rd GPR |  |  |
| Temperature | [° C.] | 85 |
| Pressure | [kPa] | 1400 |
| Split | [%] | 13 |
| C2/C3 | [mol/kmol] | 699 |
| H2/C2 | [mol/kmol] | 129 |
| MFR$_2$ | [g/10 min] | 2 |
| XCS | [wt.-%] | 29 |
| IV (XCS) | [dl/g] | 3.1 |
| C2 (XCS) | [mol-%] | 50 |
| C2 | [mol-%] | 19 |

C2 ethylene content
H2/C3 hydrogen/propylene ratio
C2/C3 ethylene/propylene ratio
H2/C2 hydrogen/ethylene ratio
1$^{st}$ 2$^{nd}$ 3$^{rd}$ GPR 1$^{st}$ 2$^{nd}$ 3$^{rd}$ gas phase reactor
Loop loop reactor
TEAL/Ti TEAL/Ti ratio
TEAL/Do TEAL/Donor ratio
MFR$_2$ melt flow rate
XCS xylene cold soluble fraction
C2 (XCS) ethylene content of the xylene cold soluble fraction
IV (XCS) intrinsic viscosity of the xylene cold soluble fraction
nd not determined The properties of the products obtained from the individual reactors naturally are not determined from homogenized material but from reactor samples (spot samples). The properties of the final resin are measured on homogenized material.

Preparation of the Examples

The Inventive Examples IE1, IE2, IE3, IE4 and IE5 and the Comparative Examples CE1, CE2 and CE3 were prepared by melt blending with a twin-screw extruder such as the Coperion STS-35 twin-screw extruder from the Coperion (Nanjing) Corporation, China. The twin-screw extruder runs at an average screw speed of 400 rpm with a temperature profile of zones from 180 to 250° C.

The Inventive Examples IE1, IE 2, IE3, IE4 and IE5 and the Comparative Examples CE1, CE2 and CE3 are based on the recipe summarized in Table 4.

TABLE 4

The recipe for preparing the inventive and comparative examples

| Example | | CE1 | CE2 | CE3 | IE1 | IE2 | IE3 | IE4 | IE5 |
|---|---|---|---|---|---|---|---|---|---|
| HECO1 | [wt %]* | 73.15 | 76.65 | 15.00 | 73.15 | 76.65 | 68.65 | 15.00 | 15.00 |
| HECO2 | [wt %]* | 7.50 |  | 10.00 | 7.50 |  |  | 10.00 | 10.00 |
| HECO3 | [wt %]* |  |  | 50.15 |  |  |  | 50.15 | 50.15 |
| Plastomer1 | [wt %]* |  |  | 9.00 | 3.50 |  |  | 9.00 | 9.00 |
| Plastomer2 | [wt %]* | 3.50 | 7.50 |  |  | 7.50 | 11.50 |  |  |
| Filler1 | [wt %]* | 15.00 |  |  |  |  |  |  |  |
| Filler2 | [wt %]* |  | 15.00 |  | 15.00 | 15.00 | 19.00 | 15.00 |  |

TABLE 4-continued

The recipe for preparing the inventive and comparative examples

| Example | | CE1 | CE2 | CE3 | IE1 | IE2 | IE3 | IE4 | IE5 |
|---|---|---|---|---|---|---|---|---|---|
| Filler3 | [wt %]* | | 15.00 | 15.00 | | | | | |
| Filler4 | [wt %]* | | | | | | | | 15.00 |

*rest to 100 wt.-% are additives in regular levels, including polymeric carrier material, antioxidants and UV-stabilizer, such as Octadecyl 3-(3',5'-di-tert. butyl-4-hydroxyphenyl) propionate in form of the commercial antioxidant "Irganox 1076" of BASF, Germany, CAS-no. 2082-79-3, colorants, such as carbon black in form of the masterbatch "Cabot Plasblak ® PE1639 (40% carbon black)" of the Cabot Corporation.
"Plastomer1" is the commercial product Engage ® 8100 of The Dow Chemical Company, which is an ethylene/1-octene copolymer having a melt flow rate MFR$_2$ (190° C., 2.16 kg) of 1.0 g/10 min and a density of 0.870 g/cm$^3$.
"Plastomer2" is the commercial product Queo ® 8201Borealis AG, which is an ethylene/1-octene copolymer having a melt flow rate MFR$_2$ (190° C., 2.16 kg) of 1.1 g/10 min and a density of 0.883 g/cm$^3$.
"Filler1" is the commercial product Jetfine ® T1CA of Imerys LLC, which is talc having an average particle size (D$_{50}$) of 1.3 μm, a cutoff particle size (D$_{95}$) of 4.2 μm.
"Filler2" is the commercial product MicaFort ® PW80 of LKAB Minerals AB, which is mica having an average particle size (D$_{50}$) of 5.4 μm, a cutoff particle size (D$_{98}$) of 29.8 μm.
"Filler3" is the commercial product Jetfine3 ® CA of Imerys LLC, which is talc having an average particle size (D$_{50}$) of 1.0 μm, a cutoff particle size (D$_{59}$) of 3.5 μm.
"Filler4" is the commercial product Luzenac ® A20 of Imerys LLC, which is talc having an average particle size (D$_{50}$) of 3.3 μm, a cutoff particle size (D$_{59}$) of 9.4 μm The properties of the Inventive Examples IE1, IE 2, IE3, IE4 and IE5 and the Comparative Examples CE1, CE2 and CE3 are summarized in Table 5.

TABLE 5

Properties of the inventive and comparative compositions

| Example | | CE1 | CE2 | CE3 | IE1 | IE2 | IE3 | IE4 | IE5 |
|---|---|---|---|---|---|---|---|---|---|
| MFR$_2$ | [g/10 min] | 10.0 | 8.0 | 10.8 | 8.5 | 8.3 | nd | 11.3 | 10.8 |
| XCS | [wt.-%]* | 28.6 | 31.1 | 30.9 | 28.6 | 31.1 | 32.5 | 30.9 | 30.9 |
| IV (XCS) | [dl/g] | 3.7 | 33 | 3.4 | 3.7 | 3.3 | 3.2 | 3.4 | 3.4 |
| TM | [MPa] | 1635 | 1508 | 1625 | 1924 | 1766 | nd | 2025 | 1473 |
| TS@Yield | [MPa] | 18.8 | 17.1 | 18.2 | 18.9 | 17.4 | nd | 18.6 | 17.6 |
| TS@Break | [MPa] | 13.0 | 12.1 | 12.6 | 11.7 | 11.4 | nd | 12.2 | 12.2 |
| TE@Break | [%] | 94 | 78 | 72 | 36 | 38 | nd | 37 | 65 |
| NIS + 23 | [kJ/m$^2$] | 63.6 | 72.0 | 55.9 | 31.6 | 40.7 | nd | 30.3 | 48.8 |
| NIS − 20 | [kJ/m$^2$] | 8.4 | 10.0 | 8.6 | 5.7 | 7.8 | nd | 6.0 | 8.0 |

*based on the total weight of the composition
"MFR$_2$" is the melt flow rate
"XCS" is xylene cold soluble (XCS) fraction
"IV(XCS)" is the intrinsic viscosity of the xylene cold soluble (XCS) fraction
"TS@Yield" is the tensile strength at yield
"TS@Break" is the tensile stress at break
"TE@Break" is the tensile elongation at break
"NIS + 23" is the charpy notched impact strength at +23° C.
"NIS − 20" is the charpy notched impact strength at −20° C.
"nd" is a value which has not been determined The adhesion performance of the Inventive Examples IE1, IE 2, IE3, IE4 and IE5 and the Comparative Examples CE1, CE2 and CE3 is summarized in Table 6.

TABLE 6

Adhesion performance of the inventive and comparative compositions

| Example | | CE1 | CE2 | CE3 | IE1 | IE2 | IE3 | IE4 | IE5 |
|---|---|---|---|---|---|---|---|---|---|
| Paintability (100 mm/s Flow Front | | | | | | | | | |
| Mean DA | [mm$^2$] | 20 | 1 | 19 | 16 | 3 | 3 | 0 | 22 |
| Median DA | [mm$^2$] | 3 | 0 | 0 | 3 | 0 | 0 | 0 | 0 |
| SD | [mm$^2$] | 28 | 3 | 34 | 22 | 5 | 7 | 0 | 35 |

TABLE 6-continued

Adhesion performance of the inventive and comparative compositions

| Example | | CE1 | CE2 | CE3 | IE1 | IE2 | IE3 | IE4 | IE5 |
|---|---|---|---|---|---|---|---|---|---|
| Paintability (400 mm/s Flow Front) | | | | | | | | | |
| Mean DA | [mm$^2$] | 94 | 81 | 70 | 13 | 18 | 31 | 35 | 33 |
| Median DA | [mm$^2$] | 88 | 87 | 64 | 10 | 14 | 11 | 20 | 29 |
| SD | [mm$^2$] | 54 | 58 | 59 | 12 | 19 | 44 | 38 | 33 |

"Mean DA" is the mean delamination area
"Median DA" is the median delamination area
"SD" is the standard deviation

The invention claimed is:

1. A polypropylene composition (C) comprising
(a) 55 to 95 parts per weight of a heterophasic propylene copolymer (HECO);
(b) 1 to 20 parts per weight of a plastomer (PL); and
(c) 4 to 25 parts per weight of an inorganic filler (F);
based on the total parts per weight of compounds (a), (b) and (c);
wherein the heterophasic propylene copolymer (HECO) has an amount of xylene cold soluble (XCS) fraction in the range of 22 to 45 wt. %; and
wherein the inorganic filler (F) is mica having a median particle size (D$_{50}$) in the range of 1.5 to 8.0 µm.

2. The polypropylene composition (C) according to claim 1, wherein the polypropylene composition (C) has:
(a) a melt flow rate MFR$_2$ (230° C., 2.16 kg) measured according to ISO 1133 of at least 2 g/10 min; and/or
(b) xylene soluble (XCS) fraction having an intrinsic viscosity (IV) of at least 3.0 dl/g.

3. The polypropylene composition (C) according to claim 1, wherein the polypropylene composition (C) has:
(a) a tensile modulus measured according to ISO 527-2 of at least 1000 MPa; and/or
(b) a tensile strength at yield measured according to ISO 527-2 of at least 5 MPa; and/or
(c) a tensile stress at break measured according to ISO 527-2 of at least 5 MPa; and/or
(d) a tensile elongation at break measured according to ISO 527-2 of not more than 100%; and/or
(e) a Charpy Impact Strength (NIS+23) measured according to ISO 179-1eA:2000 at +23° C. of at least 20 kJ/m$^2$; and/or
(f) a Charpy Impact Strength (NIS-20) measured according to ISO 179-1eA:2000 at −20° C. of at least 2 kJ/m$^2$.

4. The polypropylene composition (C) according to claim 1, wherein the heterophasic propylene copolymer (HECO) comprises
(a) 70 to 98 parts per weight of a first heterophasic propylene copolymer (HECO1); and
(b) 2 to 30 parts per weight of a second heterophasic propylene copolymer (HECO2);
wherein the first heterophasic propylene copolymer (HECO1) differs from the second heterophasic propylene copolymer (HECO2) in the comonomer content of the xylene cold soluble (XCS) fraction and/or in the intrinsic viscosity (IV) of the xylene cold soluble (XCS) fraction.

5. The polypropylene composition (C) according to claim 4, wherein the first heterophasic propylene copolymer (HECO1) and the second heterophasic propylene copolymer (HECO2) together fulfil in-equation (I):

$$C_x(XCS)[HECO1]/C_x(XCS)[HECO2] > 1.0 \quad (I)$$

wherein
C$_x$ (XCS) [HECO1] is the comonomer content of the xylene cold soluble (XCS) fraction of the first heterophasic propylene copolymer (HECO1) and
C$_x$ (XCS) [HECO2] is the comonomer content of the xylene cold soluble (XCS) fraction of the second heterophasic propylene copolymer (HECO2).

6. The polypropylene composition (C) according to claim 4, wherein the first heterophasic propylene copolymer (HECO1) and the second heterophasic propylene copolymer (HECO2) together fulfil in-equation (II):

$$IV(XCS)[HECO2]/IV(XCS)[HECO1] > 1.0 \quad (II)$$

wherein
IV (XCS) [HECO1] is the intrinsic viscosity (IV) of the xylene cold soluble (XCS) fraction of the first heterophasic propylene copolymer (HECO1) and
IV (XCS) [HECO2] is the intrinsic viscosity (IV) of the xylene cold soluble (XCS) fraction of the second heterophasic propylene copolymer (HECO2).

7. The polypropylene composition (C) according to claim 1, wherein the heterophasic propylene copolymer (HECO) comprises
(a) 5 to 30 parts per weight of a first heterophasic propylene copolymer (HECO1);
(b) 5 to 30 parts per weight of a second heterophasic propylene copolymer (HECO2); and
(c) 40 to 90 parts per weight of a third heterophasic propylene copolymer (HECO3);
wherein the first heterophasic propylene copolymer (HECO1) differs from the second heterophasic propylene copolymer (HECO2) in comonomer content of the xylene cold soluble (XCS) fraction and/or the intrinsic viscosity (IV) of the xylene cold soluble (XCS) fraction; and
wherein the third heterophasic propylene copolymer (HECO3) has a higher melt flow rate MFR$_2$ (230° C., 2.16 kg) measured according to ISO 1133 than the first heterophasic propylene copolymer (HECO1) and the second heterophasic propylene copolymer (HECO2) respectively.

8. The polypropylene composition (C) according to claim 7, wherein
(a1) the first heterophasic propylene copolymer (HECO1) and the second heterophasic propylene copolymer (HECO2) together fulfil in-equation (I):

$$C_x(XCS)[HECO1]/C_x(XCS)[HECO2] > 1.0 \quad (I)$$

wherein
$C_x$ (XCS) [HECO1] is the comonomer content of the xylene cold soluble (XCS) fraction of the first heterophasic propylene copolymer (HECO1);
$C_x$ (XCS) [HECO2] is the comonomer content of the xylene cold soluble (XCS) fraction of the second heterophasic propylene copolymer (HECO2);
and/or
(a2) the first heterophasic propylene copolymer (HECO1) and the second heterophasic propylene copolymer (HECO2) together fulfil in-equation (II):

$$IV(XCS)[HECO2]/IV(XCS)[HECO1] > 1.0 \quad (II)$$

wherein
IV (XCS) [HECO1] is the intrinsic viscosity (IV) of the xylene cold soluble (XCS) fraction of the first heterophasic propylene copolymer (HECO1);
IV (XCS) [HECO2] is the intrinsic viscosity (IV) of the xylene cold soluble (XCS) fraction of the second heterophasic propylene copolymer (HECO2); and
(b) the first heterophasic propylene copolymer (HECO1), the second heterophasic propylene copolymer (HECO2) and the third heterophasic propylene copolymer (HECO3) together fulfil in-equation (III):

$$2 \times MFR[HECO3]/MFR[HECO1] + [MFR[HECO2] > 1.0 \quad (III)$$

wherein
MFR [HECO1] is the melt flow rate $MFR_2$ (230° C., 2.16 kg) measured according to ISO 1133 of the first heterophasic propylene copolymer (HECO1);
MFR [HECO2] is the melt flow rate $MFR_2$ (230° C., 2.16 kg) measured according to ISO 1133 of the second heterophasic propylene copolymer (HECO2); and
MFR [HECO3] is the melt flow rate $MFR_2$ (230° C., 2.16 kg) measured according to ISO 1133 of the third heterophasic propylene copolymer (HECO3).

9. The polypropylene composition (C) according to claim 1, wherein the plastomer (PL) is an elastomeric ethylene copolymer (EC) comprising units derivable from ethylene and at least one $C_4$ to $C_{20}$ α-olefin.

10. The polypropylene composition (C) according to claim 1, wherein the polypropylene composition (C) does not comprise other polymers besides the heterophasic propylene copolymer (HECO) and and the plastomer (PL) in an amount exceeding 5 wt.-%, based on the weight of the polypropylene composition (C).

11. The polypropylene composition (C) according to claim 1, wherein the heterophasic propylene copolymer (HECO) and and the plastomer (PL) are the only polymers present in the the polypropylene composition (C).

12. An article comprising the polypropylene composition (C) according to claim 1.

13. A method of enhancing paint adhesion of a moulded article comprising utilizing the polypropylene composition (C) according to claim 1 in producing the moulded article.

* * * * *

UNITED STATES PATENT AND TRADEMARK OFFICE
CERTIFICATE OF CORRECTION

PATENT NO. : 11,492,478 B2
APPLICATION NO. : 16/761743
DATED : November 8, 2022
INVENTOR(S) : Kniesel et al.

It is certified that error appears in the above-identified patent and that said Letters Patent is hereby corrected as shown below:

On the Title Page

Item [72] In the listing of the inventors:
Line 1: replace "Linz (DE)" with "Linz (AT)"
Line 2: replace "Linz (DE)" with "Linz (AT)"
Line 3: replace "Linz (DE)" with "Linz (AT)"
Line 4: replace "Linz (DE)" with "Linz (AT)"
Line 4: replace "Linz (DE)" with "Linz (AT)"
Line 6: replace "Linz (DE)" with "Linz (AT)"

Signed and Sealed this
Twenty-eighth Day of February, 2023

Katherine Kelly Vidal
*Director of the United States Patent and Trademark Office*